(12) United States Patent
Nio et al.

(10) Patent No.: US 6,243,141 B1
(45) Date of Patent: Jun. 5, 2001

(54) VIDEO SIGNAL PROCESSING DEVICE

(75) Inventors: Yutaka Nio, Oosakasi; Kazuya Ueda, Suitasi; Naoki Kurita, Oosakasi, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/070,745

(22) Filed: May 1, 1998

(30) Foreign Application Priority Data

May 6, 1997 (JP) ..................................................... 9-115775

(51) Int. Cl.[7] ................................. H04N 3/27; H04N 5/46
(52) U.S. Cl. ............................ 348/554; 348/555; 348/571
(58) Field of Search ................................... 348/554, 555, 348/552, 571, 715, 718, 719, 721; H04N 3/27, 5/46

(56) References Cited

U.S. PATENT DOCUMENTS 5,389,976 * 2/1995 Miyagawa et al. ................... 348/571
5,459,526 * 10/1995 Yamada ................................. 348/558
5,555,197 * 9/1996 Ninomiya et al. .................... 348/555
5,703,658 * 12/1997 Tsuru et al. ........................... 348/554

FOREIGN PATENT DOCUMENTS 4-153759   5/1992  (JP) .

OTHER PUBLICATIONS

National Technical Report vol. 41, No. 4, Aug. 1995, pp. 416–423.

* cited by examiner

*Primary Examiner*—Michael Lee
(74) *Attorney, Agent, or Firm*—Parkhurst & Wendel, LLP

(57) ABSTRACT

A video signal processing device comprising an operating element array for processing video signals according to commands given from the outside, memories for temporarily storing the video signals according to commands given from the outside, and a network 3 for connecting the operating element array and the storage units according to commands given from the outside, thereby making it possible to switch ways of processing digitized video signals according to commands from the outside.

7 Claims, 19 Drawing Sheets

VIDEO SIGNAL PROCESSING DEVICE

FIELD OF THE INVENTION

The present invention relates to a video signal processing device which can change ways of processing video signals according to settings from the outside.

BACKGROUND OF THE INVENTION

A conventional video signal processing device includes exclusive circuits and exclusive memories for processing respective sorts of video signals.

To be specific, for example, a device for second generation extended definition television (hereinafter referred to as "HD2") has exclusive logic circuits, and exclusive memories of First-In First-Out (FIFO) and Look-Up Table (LUT), for processing respective kinds of signals (see "National TECHNICAL REPORT Vol. 41, No. 4, PP. 420, FIG. 11").

As described above, for example, to process kinds of video signals, such as ED2 and MUSE, a television receiver needs to include respective exclusive logic circuits and exclusive memories. For this reason, if a new broadcast format is created, another exclusive circuit is needed to develop for it. A period needed for developing such an exclusive circuit can be shorten if gate arrays are combined more than if a full-customized integrated circuit is manufactured, to create the exclusive circuit. In the former case, yet the period is too long. Moreover, once the circuit has been developed, it is hard to amend it, and so, if a bug is found in the circuit, the problem is serious.

To avoid those situations, we came up with a conception of a device including an array of operating elements, storage units, and a network connecting the operating elements and the storage units, all of which works according to commands from the outside, and processing video signals in a way suited to their respective sorts by changing programs downloaded to the array of operating elements.

SUMMARY OF THE INVENTION

The object of this invention is to provide a video signal processing device which can process different kinds of video signals with the use of the same hardware, based on the above-mentioned conception.

Other objects and advantages of the present invention will become apparent from the detailed description desired hereinafter; it should be understood, however, that the detailed description and specific embodiment are desired by way of illustration only, since various changes and modifications within the scope of the invention will become apparent to those skilled in the art from this detailed description.

According to a first aspect of this invention, a video signal processing device changing ways of processing digitized video signals, according to commands from programs, and comprising:

an operating unit for processing the video signals according to commands from the programs;

a storage unit for storing the video signals according to commands from the programs; and a networking unit for switching connections between the operating unit and the storage unit according to commands from the programs.

Thereby, the video signal processing device produces the flexible connection between the operating unit and the storage unit according to input commands, and therefore, changes ways of processing video signals according to commands from the outside. As a result, the same hardware can deal with different kinds of video signals.

According to a second aspect of this invention, the video signal processing device of the first aspect wherein the operating unit comprises an operator and an operation element command memory, the operator processing the video signals, and the operation execute command memory holding a command of operating the operator, and outputting the command to the operator according to input commands;

the networking unit comprises selectors and signal switching command memories, the selectors receiving the video signals from either the operating unit or the storage unit, switching the operating unit and the storage unit, and outputting the input video signals to either the operating unit or the storage unit, and the signal switching command memories holding commands of operating the selectors, and outputting the commands to the selectors according to input commands; and the storage unit comprises a data memory, a command setting unit, and a register, the data memory storing data related to the video signals input from the networking unit, the command setting unit setting commands to the data memories, the register storing the commands set by the command setting unit, and the data memory processing the stored data according to the commands stored in the register, and outputting the processed data to the networking unit.

Thereby, the operating unit changes operations for processing video signals according to input commands, the network unit produces the flexible connection between the operating unit and the storage unit according to input commands, the storage unit changes its function according to input commands, and therefore, the video signal processing device can change ways of processing video signals according to commands from the outside. As a result, the same hardware can deal with different kinds of video signals.

According to a third aspect of this invention, the video signal processing device of the second aspect wherein the data memory comprises a storage element for storing digital data wherein the storage element executes a First-In First-Out process for the video signals by storing digital data in the storage element in an order in which digital data have been input;

the storage element executes a histogram process by controlling the storage element in a way in which tones of the video signals correspond to addresses of the storage element, and by adding a predetermined value to the corresponding addresses to successively calculate histograms; and the storage element executes a look-up table process including correcting tones of the video signals by control of the storage element.

As a result, a video signal processing device can include a data memory which can process an FIFO process, a histogram process, and a look-up table process, according to input commands, with the same memory.

According to a fourth aspect of this invention, the video signal processing device of the second aspect wherein the data memory comprises a storage element for storing digital data;

a controller for controlling the storage element;

an incrementer for adding 1 to a signal output from the storage element;

a limiter for limiting an output of the incrementer to a predetermined value;

a first selector for selecting one of an output of the limiter, the input video signal, and data input from outside the device, and storing the selected one in the storage element;

a second selector for selecting one of the input video signal, an address output from the controller, and an address input from outside the device, and switching the input address of the storage element to the selected one;

a third selector for selecting one of a memory control signal output from the controller, and a memory control signal input from outside the device, and storing the selected one in the storage element; and a buffer for outputting a signal output from the storage element, outside the device.

As a result, a video signal processing device can include a data memory which can carry out various processes with the same memory.

According to a fifth aspect of this invention, the video signal processing device of the fourth aspect wherein in an FIFO process for video signals, the controller controls the first selector so that the storage element stores the input video signals, controls the second selector so that the input address of the storage element is switched to the address output from the controller, and controls the third controller so that the memory control signal output from the controller is output, as a data rewrite signal, to the storage element;

in a histogram process for video signals, initially, the controller, in a blanking period of the video signals, controls the first selector so that the storage element stores data input from outside the device, controls the second selector so that the input address of the storage element is switched to the address input from outside the device, controls the third selector so that the third selector outputs a memory control signal input from outside the device, as a data rewrite signal, to the storage element, and controls the buffer so that the buffer is inactive, and thereby, the data memory is reset; and next, in a video period, the controller controls the first selector so that the storage element stores outputs of the limiter, controls the second selector so that the input address of the storage element is switched to the input video signal, controls the third selector so that the storage element stores a memory control signal output from the controller, and outputs a data rewrite signal to the storage element so that accumulation is carried out in the storage element; afterward, the controller controls the second selector so that the input address of the storage element is switched to the input address from outside the device, controls the third selector so that a memory control signal input from outside the device, as a data read out signal, is output to the storage element, and controls the buffer so that the buffer becomes inactive, and thereby, reading out data from the storage element is carried out;

in a look-up table process including tone correction for video signals, the controller controls the first selector so that the storage element stores data input from outside the device, controls the second selector so that the input address of the storage element is switched to the input address from outside the device, controls the third selector so that a memory control signal input from outside the device, as a data write signal, is output to the storage element, and controls the buffer so that the buffer becomes inactive, and writing data to the storage element is carried out; and next, the controller controls the second selector so that the input address of the storage element is switched to the input video signal, and controls the third selector so that a memory control signal, as a data read out signal output from the controller, is output to the storage element, and thereby, correcting tones of the video signals is carried out.

As a result, a video signal processing device can include a data memory which can process an FIFO process, a histogram process, and a look-up table process, according to input commands, with the same memory.

According to a sixth aspect of this invention, the video signal processing device of the second aspect wherein the data memory comprises a storage element for storing digital data;

a controller for controlling the storage element;

an incrementer for adding 1 to a signal output from the storage element;

a limiter for limiting an output of the incrementer to a predetermined value;

a first selector for selecting one of the input video signal and 0 values, and outputting the selected one as a switching signal;

a second selector for selecting one of an output of the limiter, the input video signal, and data input from outside the device, and storing the selected one in the storage element;

a third selector for selecting one of the input video signal, an address output from the controller, and an address input from outside the device, and switching the input address of the storage element to the selected one;

a fourth selector for selecting one of a memory control signal output from the controller, and a memory control signal input from outside the device, and storing the selected one in the storage element; and a buffer for outputting a signal output from the storage element, outside the device.

As a result, a video signal processing device can include a data memory which can carry out various processes with the same memory.

According to a seventh aspect of this invention, the video signal processing device of the sixth aspect wherein in an FIFO process for video signals, the controller controls the first selector so that the first selector outputs the input video signal as a switching signal, controls the second storage element so that the storage element stores the switching signal as data, controls the third selector so that the input address of the storage element is switched to the address output from the controller, and controls the fourth controller so that the memory control signal output from the controller is output, as a data rewrite signal, to the storage element;

in a histogram process for video signals, initially, the controller, in a blanking period of the video signals, controls the first selector so that 0 values are output as a switch signal, controls the second selector so that the storage element stores the switching signal input as data, controls the third selector so that the input address of the storage element is switched to the address output from the controller, controls the fourth selector so that a memory control signal input from outside the device is output, as a data rewrite signal, to the storage element, and controls the buffer so that the buffer is inactive, and thereby, the data memory is reset; and next, in a video period, the controller controls the second selector so that the storage element stores outputs of the limiter as data, controls the third selector so that the input address of the storage element is switched to the input video signal, and controls the fourth selector so that a memory control signal output from the controller is output, as a data rewrite signal, to the storage element, and thereby, accumulation is carried out in the storage element;

afterward, the controller controls the third selector so that the input address of the storage element is switched to the input address from outside the device, controls the fourth selector so that a memory control signal input from outside the device, as a data read out signal, is output to the storage element, and controls the buffer so that the buffer becomes inactive, and thereby, reading out data from the storage element is carried out;

in a look-up table process including tone correction for video signals, the controller controls the second selector so that the storage element stores data input from outside the device, controls the third selector so that the input address of the storage element is switched to the input address from outside the device, controls the fourth selector so that a memory control signal input from outside the device, as a data write signal, is output to the storage element, and controls the buffer so that the buffer becomes inactive, and thereby, writing data to the storage element is carried out;

next, the controller controls the third selector so that the input address of the storage element is switched to the input video signal, controls the fourth selector so that a memory control signal, as a data read out signal output from the controller, is output to the storage element, and thereby, correcting tones of the video signals is carried out.

As a result, a video signal processing device can include a data memory which can process an FIFO process, a histogram process, and a look-up table process, according to input commands, with the same memory.

According to an eighth aspect of this invention, a video signal processing device comprising at least two storage units including the data memories of the second aspect;

a processor for setting commands, reading out data, and writing data, to the data memories included in the storage units;

an interface unit for interfacing the storage units with the processor;

a histogram of input video signals being calculated with the data memory included one of at least the two storage units, the calculated histogram being transmitted through the interface unit to the processor, the processor detecting tone correcting data for the video signals based on the histogram transmitted, and the tone correcting data detected being transmitted through the interface unit to another of at least the two storage units.

As a result, a video signal processing device can optimally correct tones of input video signals.

DETAILED DESCRIPTION OF THE PREFERRED EMBODIMENTS

Embodiments of the present invention will be described referring to accompanying drawings.

[Embodiment 1]

Figure 1:
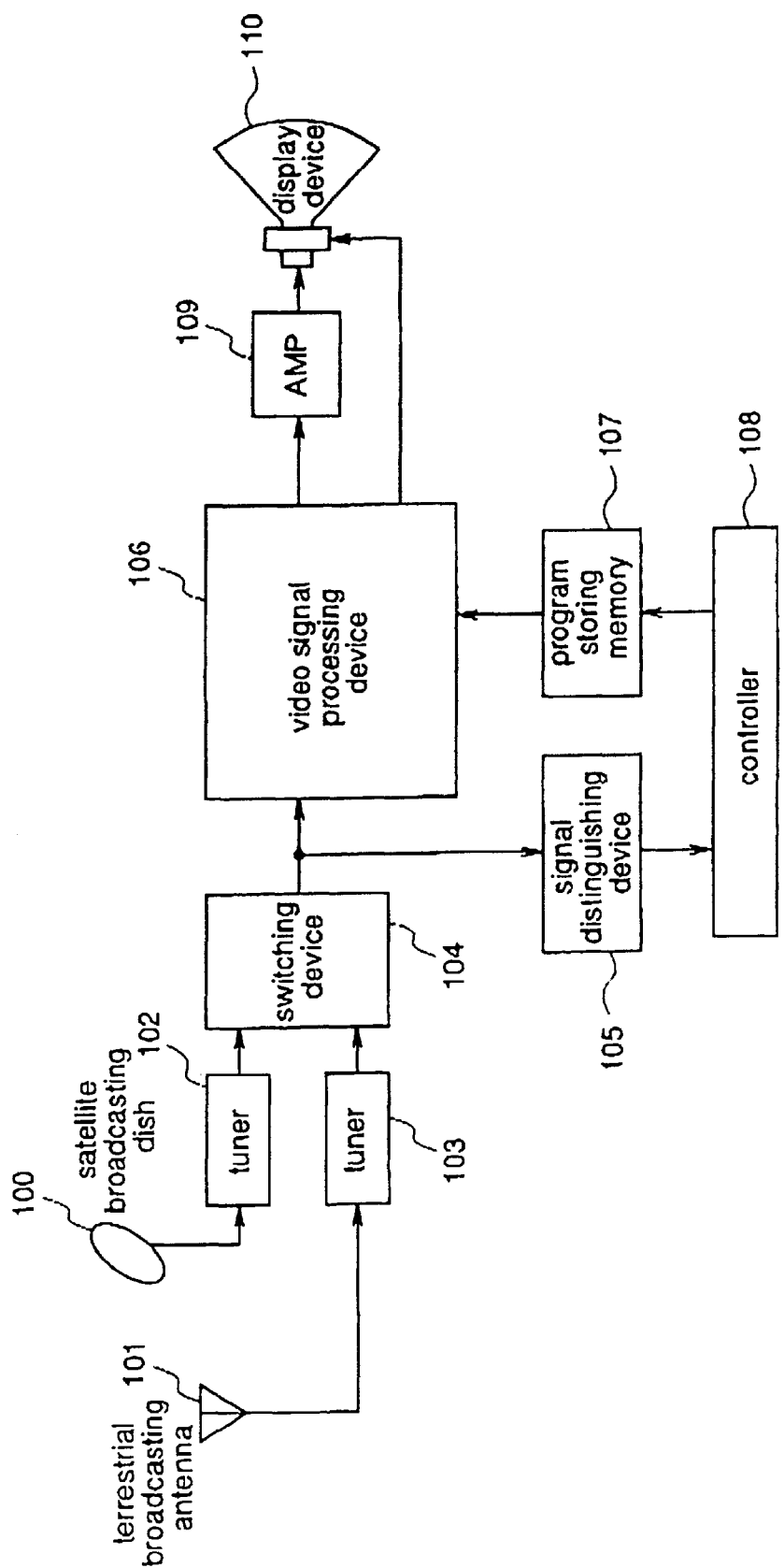
FIG. 1 is a block diagram showing a configuration of a television receiver to which a video signal processing device in accordance with a first embodiment of this invention is applied.

FIG. 1 is a block diagram showing a configuration of a television receiver as an example to which a video signal processing device according to a first embodiment of this invention is applied.

In FIG. 1, the television receiver comprises a satellite broadcasting dish 100, a terrestrial broadcasting antenna 101, a satellite broadcasting tuner 102, a terrestrial broadcasting tuner 103, a switching device 104, a signal discriminating device 105, a video signal processing device 106, a program storing memory 107, a controller 108, an amplifier (AMP) 109, and a display device 110. The satellite broadcasting dish 100 receives broadcasting of NTSC, MUSE, and other formats. The terrestrial broadcasting antenna 101 receives broadcasting of an NTSC format and with crystal-clear programs with wide-screen, and the like. The satellite tuner 102 selects among broadcast programs received by the satellite broadcasting dish 100. The terrestrial broadcasting tuner 103 selects among broadcast programs received by the terrestrial broadcasting antenna 101. The switching device 104 switches between the broadcast programs selected by the satellite broadcasting tuner 102 and the broadcast programs selected by the terrestrial broadcasting tuner 103. The signal discriminating device 105 discriminates kinds of signals of the broadcast programs selected by the switching device 104. The video signal processing device 106 processes digitized video signals by changing ways of processing the video signals according to contents of programs downloaded. The program storing memory 107 stores a plurality of programs prepared in advance for plural ways of signal processing executed in the video signal processing device 106. The controller 108 sends a program assigned to process a kind of signals discriminated by the signal discriminating device 105, to the video signal processing device 106. The amplifier 109 amplifies the video signals after having been processed by the video signal processing device 106. The display device 110 displays the video signals after having been amplified by the amplifier 109.

A description is given of operation of the television receiver.

For example, if it is assumed that the switching device 104 selects an output of the satellite broadcasting tuner 102, and that the signal discriminating device 105 decides that the output is MUSE, a program for processing MUSE signals is downloaded from the program storing memory 107 to the video signal processing device 106. Thereafter, the video signal processing device 106 processes the MUSE signals. Afterward, the signals are displayed on the display device 110 after having been amplified by the amplifier 109. The signal discriminating device 105 discriminates kinds of broadcast signals based on the horizontal frequency and vertical frequency of input video signals, and the identification signals multiplexed in blanking periods of video signals.

Figure 2:
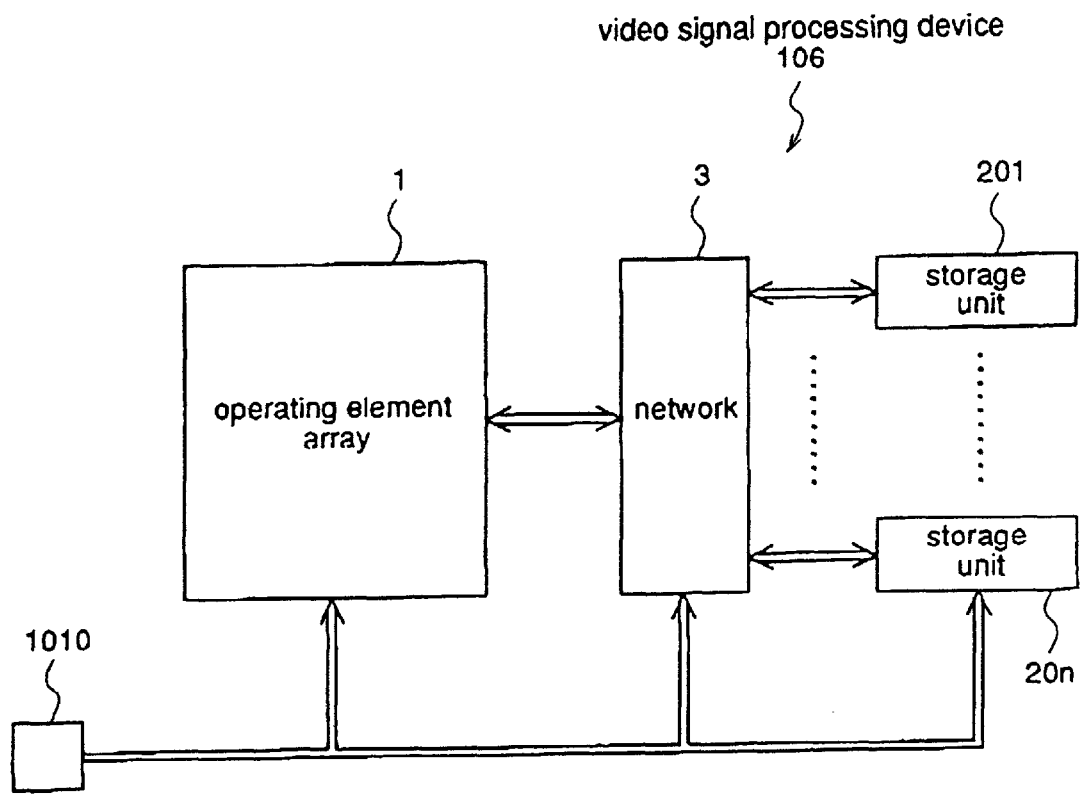
FIG. 2 is a block diagram showing a configuration of the video signal processing device 106 in accordance with the first embodiment.

FIG. 2 is a block diagram showing a configuration of the video signal processing device 106 of the television receiver shown in FIG. 1.

In FIG. 2, the video signal processing device 106 comprises an operating element array 1 for processing video signals according to commands input from the outside, storage units 201, . . . , 20n for temporarily storing video signals according to commands input from the outside, and a network 3 for connecting the operating element array 1 to the storage units 201, . . . , 20n according to commands from the outside. A reference numeral 1010 indicates a command input terminal for inputting commands to the operating element array 1 and the storage units 201, . . . , 20n.

Figure 3:
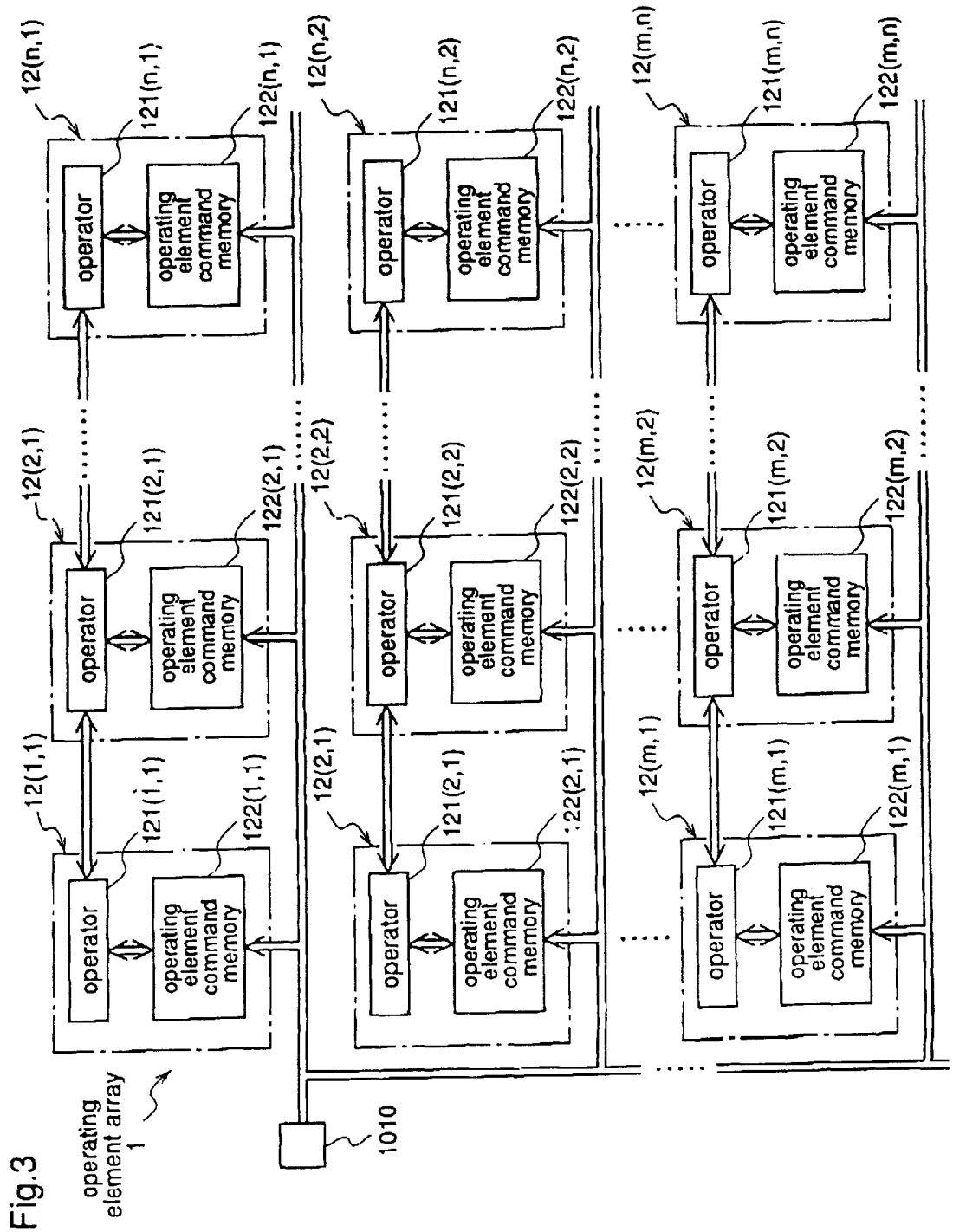
FIG. 3 is a block diagram showing a configuration of an operating element array.

FIG. 3 is a block diagram showing a configuration of the operating element array 1 shown in FIG. 2.

In FIG. 3, the operating element array 1 comprises operating elements 12(1, 1), . . . , 12(m, n) which execute operation. Here, n elements are arranged in a line while m elements in a row intersecting perpendicularly to the line. Thus, all elements are arranged in an m×n matrix as a whole.

The operating elements 12(1, 1), . . . , 12(m, n) comprise operators 121(1, 1), . . . , 121(m, n) for operating video signals, and operation element command memories 122(1, 1), . . . , 122(m, n) for storing commands for operating the operators 121(1, 1), . . . , 121(m, n) (the commands are hereinafter referred to as "operation executing commands"), and outputting the commands to the operators 121(1, 1), . . . , 121(m, n) according to input commands, respectively.

Figure 4:
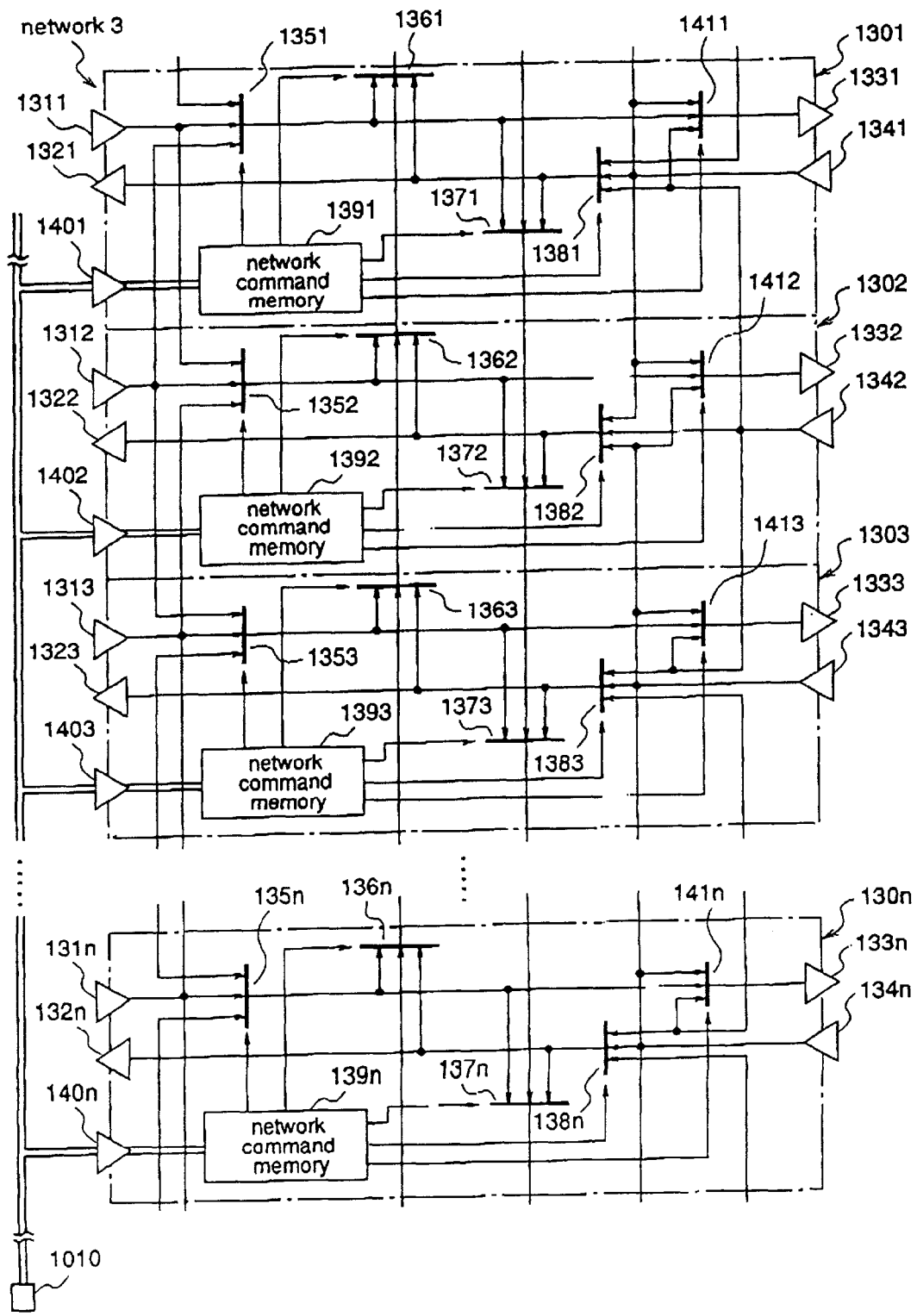
FIG. 4 is a block diagram showing a configuration of a network.

FIG. 4 is a block diagram showing a configuration of a network 3 shown in FIG. 2.

In FIG. 4, the network 3 comprises network elements 1301, . . . , 130n.

The network elements 1301, . . . , 130n comprise selectors 1351, , . . . , 135n, 1361, . . . , 136n, 1371, . . . , 137n, 1381, . . . , 138n, . . . , and 1411, . . . , 141n for selecting at most one of video signals input from three input lines and outputting the signal selected, and 1391, . . . , 139n for storing commands of switching signals for the selectors 1351, . . . , 135n, 1361, . . . , 136n, 1371, . . . , 137n, 1381, . . . , 138n, . . . , and 1411, . . . , 141n (the commands are hereinafter referred to as "signal switching commands"), and outputting the commands to the selectors 1351, . . . , 135n, 1361, . . . , 136n, 1371, . . . , 137n, 1381, . . . , 138n, . . . , and 1411, . . . , 141n according to input commands, respectively.

In FIG. 4, reference numerals 1311, . . . , 131n indicate data input terminals connected to the operating element array 1. Reference numerals 1321, . . . , 132n indicate data output terminals connected to the operating element array 1. Reference numerals 1331, . . . , 133n indicate output terminals connected to the storage units 201, . . . , 20n, respectively. Reference numerals 1341, . . . , 134n indicate input terminals connected to the storage units 201, . . . , 20n, respectively. Reference numerals 1401, . . . , 140n indicate command input terminals connected to the network command memories 1391, . . . , 139n, respectively.

The operation of the video signal processing device 106 is explained.

When the video signal processing device 106 changes ways of processing digitized video signals according to contents of programs downloaded, the operating element array 1 processes the video signals according to commands input from the outside. The storage units 201, . . . , 20n temporarily stores the video signals according to commands from the outside. The network 3 connects the operating element array 1 to the storage units 201, . . . , 20n.

The operation of each of the operating elements 12(1, 1), . . . , 12(m, n) of the operating array 1 at the time is described as follows.

The operation element command memories 122(1, 1), . . . , 122(m, n) of the operating elements store the operation executing commands for the operator 121(1, 1), . . . , 121(m, n) respectively. The operation element comand memories 122(1, 1), . . . , 122(m, n) output the operation executing commands stored to the operator 121(1, 1), . . . , 121(m, n) according to input commands, respectively. Thereafter, the operator 121(1, 1), . . . , 121(m, n) process the video signals according to the operation executing commands.

The network elements 1301, . . . , 130n of the network 3 work as follows.

The network commands memory 1391, . . . , 139n of the network elements each store the signal switching command. The network command memories 1391, . . . , 139n output the signal switching commands to the select units 1351, . . . , 135n, 1361, . . . , 136n, 1371, . . . , 137n, 1381, . . . , 138n, . . . , and 1411, . . . , 141n according to input commands, respectively. Thereafter, the select units 1351, . . . , 135n, 1361, . . . , 136n, 1371, . . . , 137n, 1381, . . . , 138n, . . . , and 1411, . . . , 141n switch the video signals according to the signal switching commands. The operating elements 12 (1, 1), . . . , 12(m, n) each output the video signals to one of the storage units 201, . . . , 20n, or each output video signals from one of the storage units 201, . . . , 20n, to the operating element array 1.

As described above, in the video signal processing device 106 in accordance with the first embodiment, the operating element array 1 and the storage units 201, . . . , 20n can be flexibly connected with each other, according to commands input to this device.

Thus, the video signal processing device 106 in accordance with the first embodiment can switch ways of processing video signals according to commands input from the outside. As a result, different kinds of processes for different kinds of video signals, such as Y/C separation for NTSC-formatted signals, and MUSE decoding for MUSE-formatted signals, are carried out by the same hardware.

A typical example shows the foregoing effect. BY selectively operating the select units 1351, . . . , 135n, 1361, . . . , 136n, 1371, . . . , 137n, 1381, . . . , 138n, . . . , and 1411, . . . , 141n according to commands input to the video signals processing device 106, vertical Low Pass Filter (LPF), which is commonly used in video signal processing, can be realized.

Figure 6:
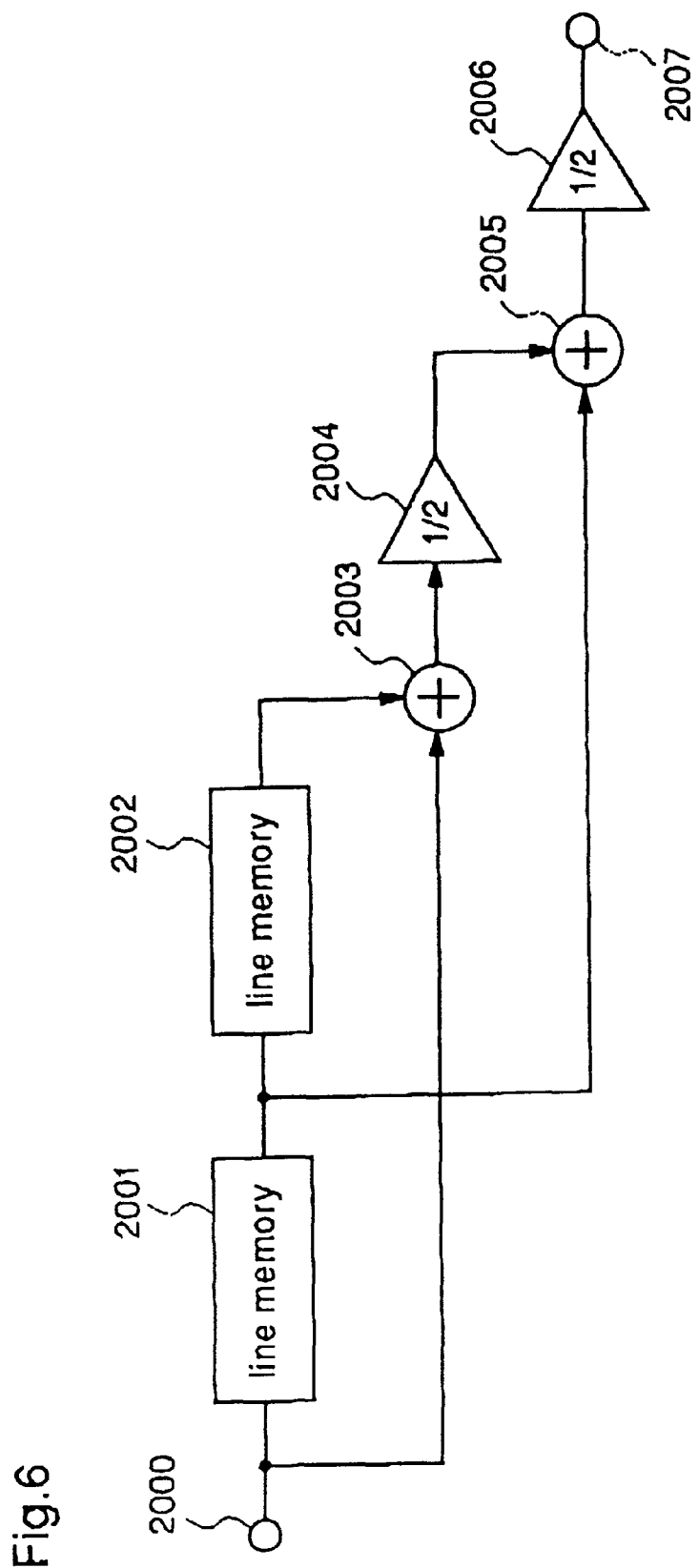
FIG. 6 is a block diagram showing a configuration of vertical LPF commonly used in a signal processing technology.

FIG. 6 is a block diagram showing a configuration of the vertical LPF.

In FIG. 6, a reference numeral 2000 indicates an input terminal for the new video signals. 2001 indicates a first line memory which stores a line of video signal input from the input terminal 2000. 2002 indicates a second line memory which stores a line of video signal output from the first line memory 2001. 2003 indicates a first adder which adds a video signal input from the input terminal 2000 and a video signal output from the second line memory 2002. 2004 indicates a first multiplier which multiplies a video signal output from the first adder 2003 by a half. 2005 indicates a second adder which adds a video signal output from the first line memory 2001 and a video signal output from the first multiplier 2004. 2006 indicates a second multiplier which multiplies a a video signal output from the second adder 2005 by a half. 2007 indicates an output terminal which outputs a video signal output from the second multiplier 2006, i.e., a video signal having been subjected to a vertical LPF process.

A description is given of an example of the video signal processing device 106 realizing the vertical LPF.

Initially, programs for carrying out the vertical LPF process are downloaded to the operation element command memories 122(1, 1), . . . , 122(m, n) and the network command memories 1391, . . . , 139n.

Figure 5:
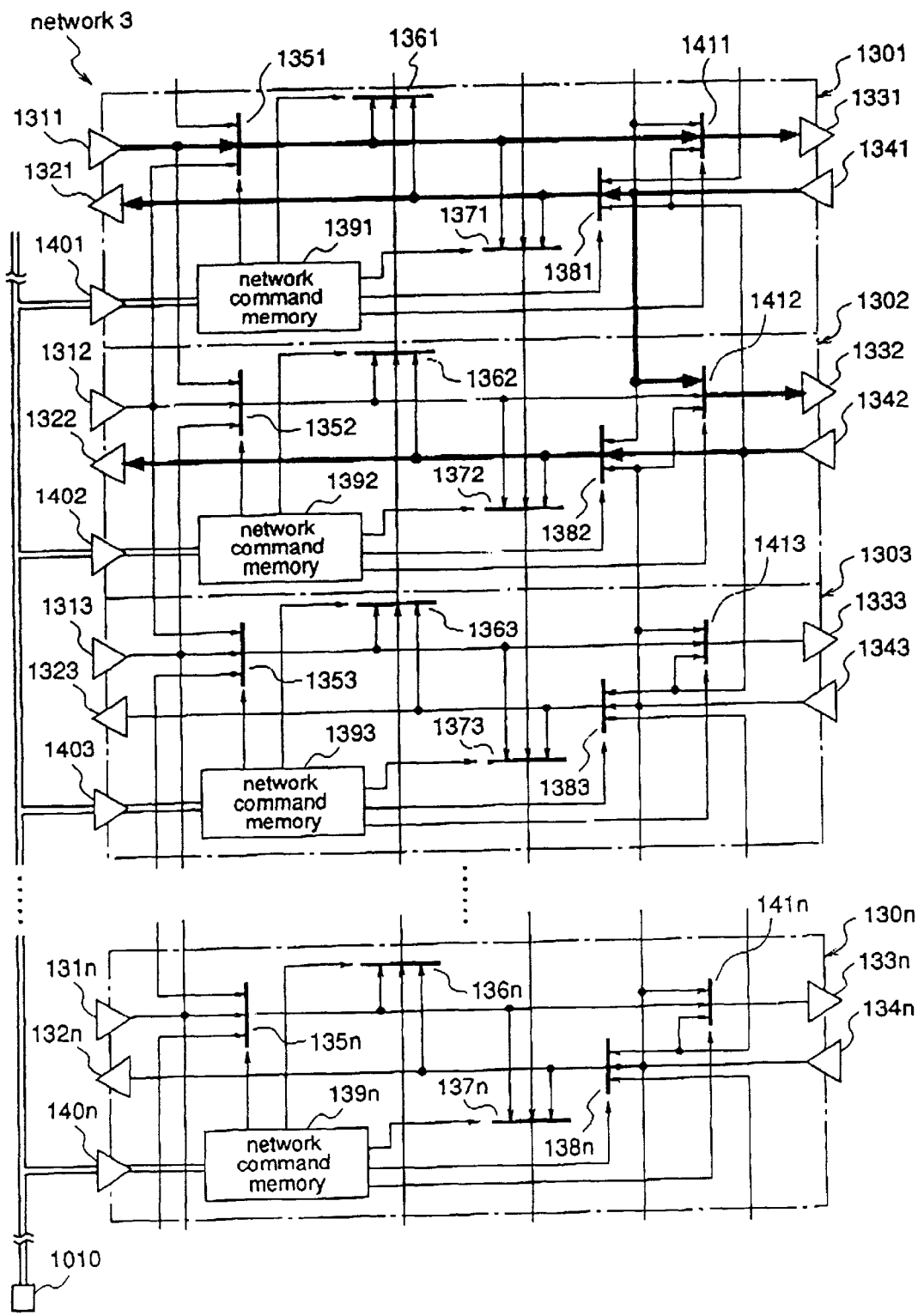
FIG. 5 is a diagram showing an example of operation of the network.

Referring to FIG. 5, an example of operation of the network 3 is explained.

FIG. 5 is a diagram showing an example of how the network 3 works.

The operating element 12(n, 1) in first row inputs a video signal to the data input terminal 1311. The video signal is selected by the selector 1351 in first row. The video signal selected by the selector 1351 is further selected by the selector 1401, and output through the output terminal 1331 to the storage unit 201 in first row.

The video signal is processed by the storage unit 201 to have a delay of one line, and input to the input terminal 1341 in first row. The video signal input to the input terminal 1341 is selected by the selector 1381 in first row, and output, as a signal having a delay of one line to the original input signal, through the output terminal 1321 to the operating element 12(n, 1) in first row. Thus, a signal equivalent to an output signal of the first line memory 2001 shown in FIG. 6 is produced.

Meanwhile, the signal output through the input terminal 1341 in first row is selected by the selector 1412 in second row, and output through the output terminal 1332 to the storage unit 202 in second row.

The video signal is processed by the storage unit 202 to have a delay of more a line, and input to the network 3 through the input terminal 1342 in second row. The video signal input through the input terminal 1342 is selected by the selector 1382 in second row, and output, as a signal having a delay of two lines to the original input signal, through the output terminal 1322 to the operating element 12(n, 2) in second row. Thus, a signal equivalent to an output signal of the second line memory 2002 shown in FIG. 6 is produced.

Further, the signal with a delay of one line input to the operating element 12(n, 1) and the signal with a delay of two lines input to the operating element 12(n, 2) are subjected to processes equivalent to the addition by the first adder 2003, the multiplication by the first multiplier 2004, the addition by the second adder 2005, and the multiplication by the second multiplier 2006 shown in FIG. 6, by the use of one or plural operating elements of the operating element array 1.

Consequently, the video signal processing device 106 in accordance with the first embodiment can realize vertical LPF as shown in FIG. 6.

Embodiment 2

Figure 7:
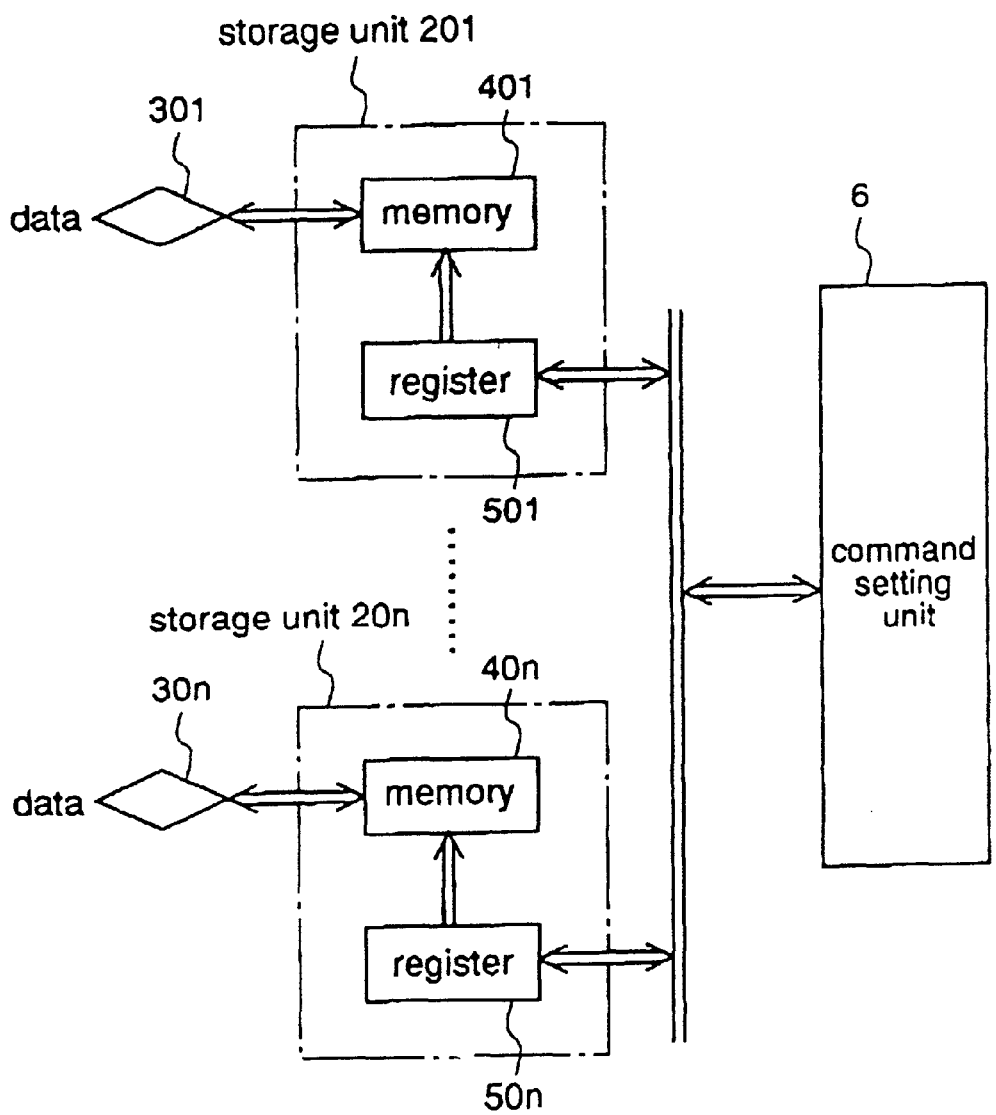
FIG. 7 is a block diagram showing a configuration of a storage unit of a video signal processing device in accordance with a second embodiment of this invention.

FIG. 7 is a block diagram showing a configuration of storage units of a video signal processing device in accordance with a second embodiment.

FIG. 7 illustrates a specific example of the storage units shown in FIG. 2. In FIG. 7, the video signal processing device comprises storage units 201, . . . , 20n, programmable memories 401, . . . , 40n for storing data related to video signals input from the network 3 and able to process the data, a command setting unit 6 for setting commands to the memories 401, . . . , 40n, and registers 501, . . . , 50n for storing the commands set by the command setting unit 6. The memories 401, . . . , 40n are configurated so that the memories 401, . . . , 40n process data stored, according to the commands stored in the registers 501, . . . , 50n, and outputs the data processed to the network 3. The other portion of the configuration is similar to that of the first embodiment.

In FIG. 7, reference numerals 301, . . . , 30n designate data input/output terminals.

An explanation is given of how the video signal processing device operates.

When the power turns on, or the operating mode, i.e., write or read, changes, the command setting unit 6 sends settings or commands, such as the operating modes of the memories 401, . . . , 40n, that is, start addresses and end addresses of write or read, to the register 501, . . . , 50n.

Thereafter, the memories 401, . . . , 40n, according to the commands and values set, store and process data input through the data input/output terminal 301, . . . , 30n, and output the data processed through the data input/output terminal 301, . . . , 30n.

That is, the video signal processing device in accordance with the second embodiment processes the data stored, according to the commands stored in the registers 501, . . . , 50n, and outputs the data processed to the network 3.

Thus, according to the second embodiment, memories can change ways of processing in video signals stored, according to commands from the outside. As a result, the same hardware can readily realize the operation that the designer or the user aims, and when a new format becomes practical for video signals, can flexibly deal with it.

Embodiment 3

Figure 8:
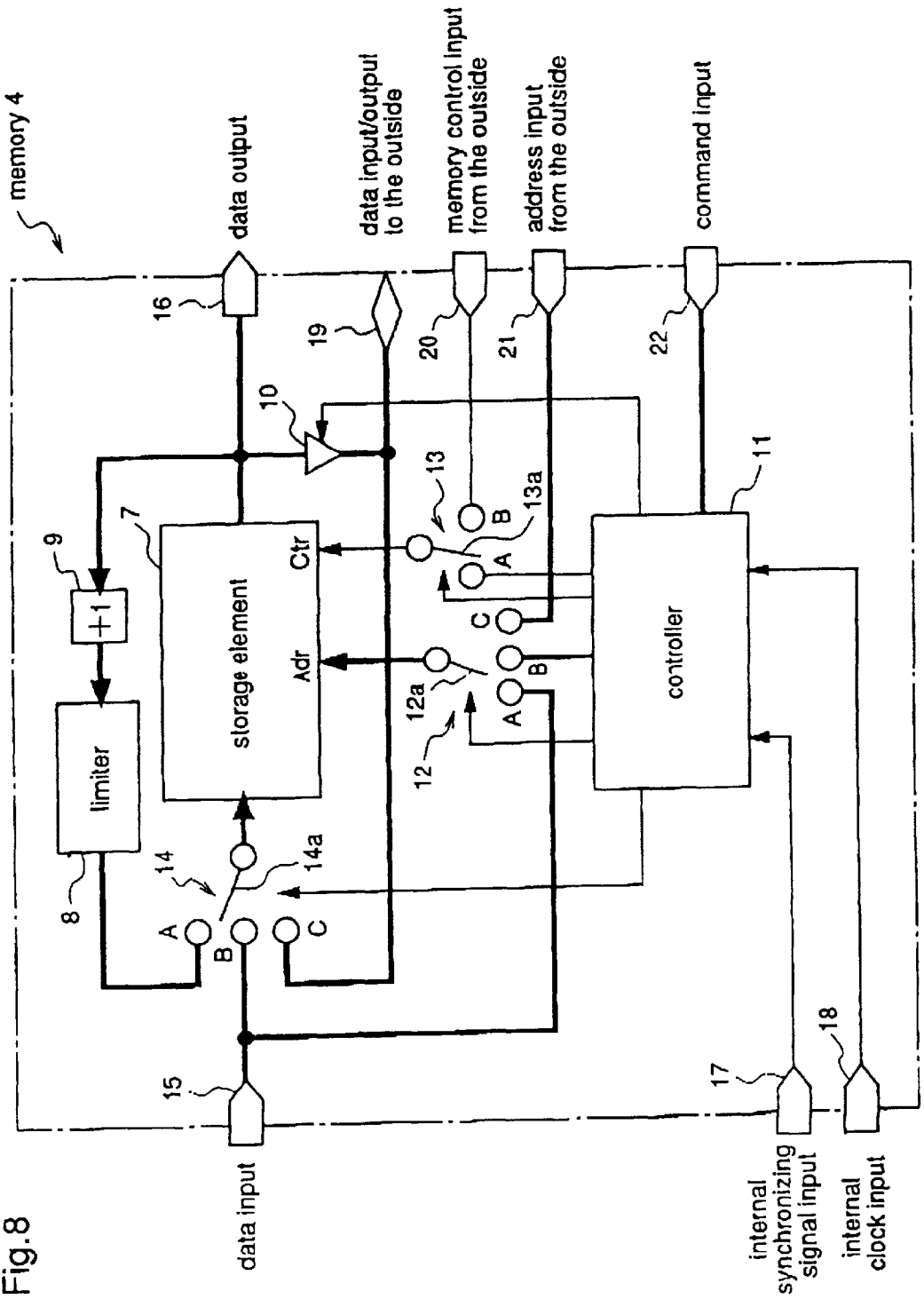
FIG. 8 is a block diagram showing a configuration of a memory of a video signal processing device in accordance with a third embodiment of this invention.

FIG. 8 is a block diagram illustrating a configuration of a memory of a video signal processing device in accordance with a third embodiment of this invention.

FIG. 8 shows a more specific example of the storage unit shown in FIG. 2. As shown in FIG. 8, a memory 4 of the video signal processing device comprises a storage element 7, a controller 11, an incrementer 9, a limiter 8, a first switching device 14 (hereinafter referred to as "first SW"), a second switching device 12 (hereinafter referred to as "second SW"), a third switching device 13 (hereinafter referred to as "third SW"), and a buffer 10. The storage element 7 stores digital data. The controller 11 controls the storage element 7. The incrementer 9 adds 1 to an output signal of the storage element 7. The limiter 8 limits an output of the incrementer 9 to a predetermined value. The first SW 14 selects one of an output of the limiter 8 (terminal A), an input video signal (terminal B), and input data of an external system, such as an external processor not shown (hereinafter referred to as "external processor"), (terminal C) and stores the selected one in the storage element 7 as data. The second SW 12 selects one of an input video signal (terminal A), an address output from the controller 11 (terminal B), and an input address of the external processor (terminal C), and switches the input addresses of the storage element 7 to the selected one. The third SW 13 selects one of a signal for controlling the storage element output from the controller 11 (hereinafter referred to as "storage element control signal") (terminal A), and a signal for controlling the storage element output from the external processor (hereinafter referred to as "memory control signal") (terminal B), and stores the selected one in the storage element 7 as data. The buffer 10 outputs the output of the storage element 7 to the external processor. The first SW 14, the second SW 12, the third SW 13, the buffer 10, and switching control signals of the storage element 7, can realize the FIFO (First-In First-Out) process, the histogram process, and the LUT (Look-Up Table) process including tone correction, shown in TABLE 1, for video signals, using the same memory device made of the programmable memory 4. The other configuration is similar to that of the second embodiment. Note that the memory 4 is equivalent to the memories 401, . . . , 40n of the second embodiment.

Further, in FIG. 8, a reference numeral 15 indicates a data input terminal for such signals as video signals and address signals. 16 indicates a data output terminal outputting data output from the storage element 7. 17 indicates an internal synchronizing signal input terminal. 18 indicates an internal clock input terminal. 19 indicates an external data input/output terminal. 20 indicates an external memory control signal input terminal. 21 indicates an external address input terminal. 22 indicates a command input terminal. 12a, 13a, and 14a indicate armatures.

TABLE 1

| OPERATION (COMMAND) | 1ST SW 14 | 2ND SW 12 | 3RD SW 13 | BUF 10 | CTR |
|---|---|---|---|---|---|
| FIFO | B | B | A | — | W/R |
| HISTOGRAM | | | | | |
| ① MEMORY RESET | C | C | B | H (Hi Z) | W |
| ② ACCUMULATION | A | A | A | — | W/R |
| ③ DATA READ | — | C | B | L | R |
| LUT | | | | | |
| ④ DATA WRITE | C | C | B | H (Hi Z) | W |
| ⑤ TONE CORRECTION | — | A | A | — | R |

For the memory 4, DRAM (Dynamic Random Access Memory), or SRAM (Static Random Access Memory), or the like can be used as the storage element 7.

Further, 3 STATE BUFFER can be used as the buffer 10.

the operation of the video signal processing device is explained referring to FIGS. 8, 9, 10, 11, 12 and 13, and TABLE 1.

Figure 9:
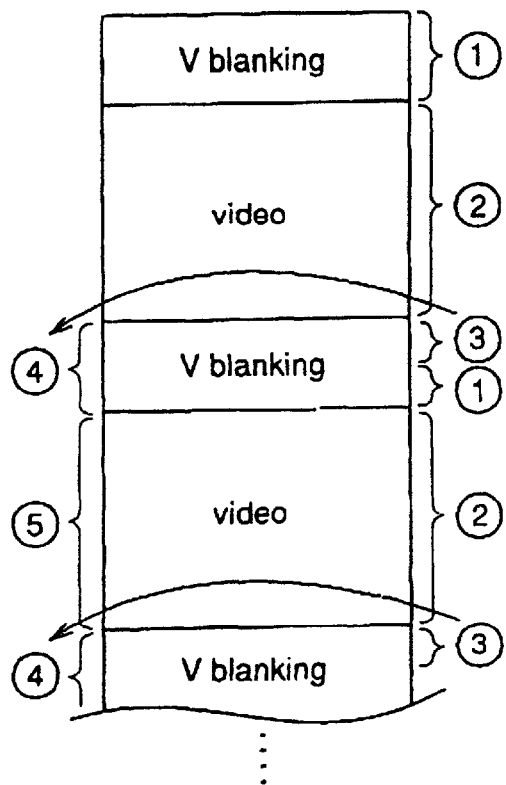
FIG. 9 is a diagram showing operational timings of each of a histogram process and an LUT process.

FIG. 9 is a diagram showing timings of operations of a histogram process and an LUT process.

Figure 10:
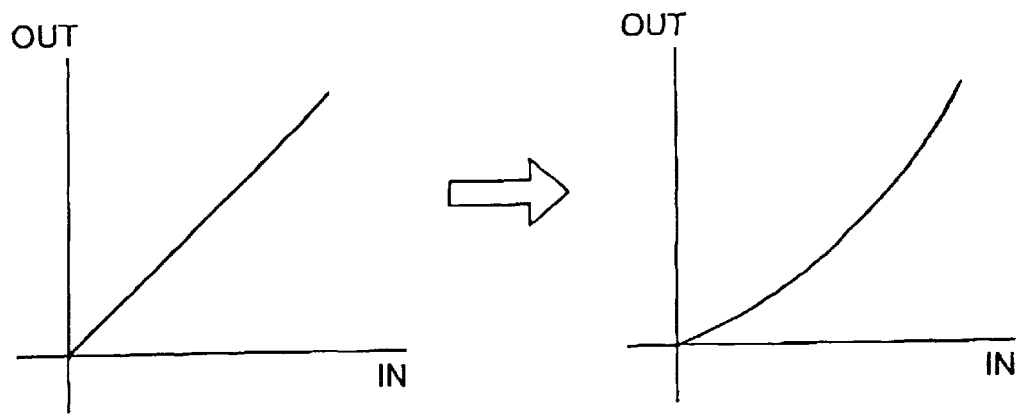
FIGS. 10(a) and (b) are diagrams showing an effect of a tone correcting process.

FIG. 10 is a diagram showing effects by a tone correcting process as an example of the LUT process.

Figure 11:
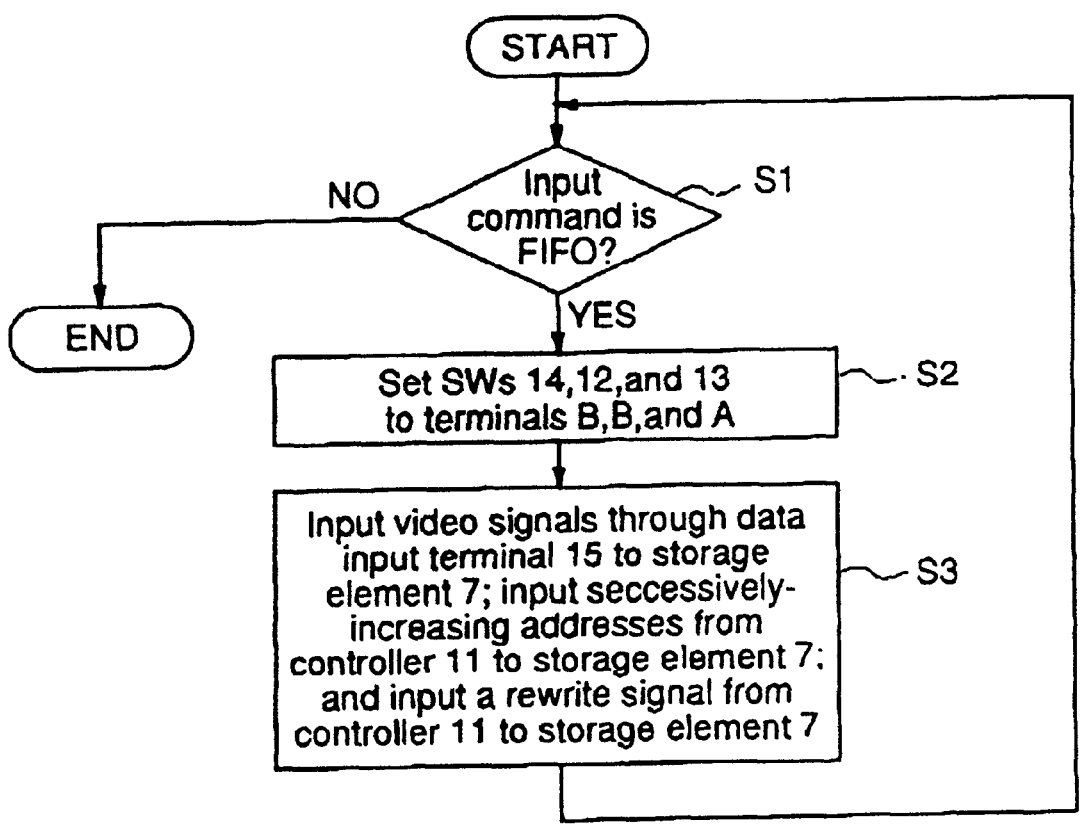
FIG. 11 is a flowchart showing how a memory of the video signal processing device in accordance with the third embodiment of this invention operates in executing an FIFO process.

FIG. 11 is a flowchart showing an FIFO process executed by the memory shown in FIG. 8.

Figure 12:
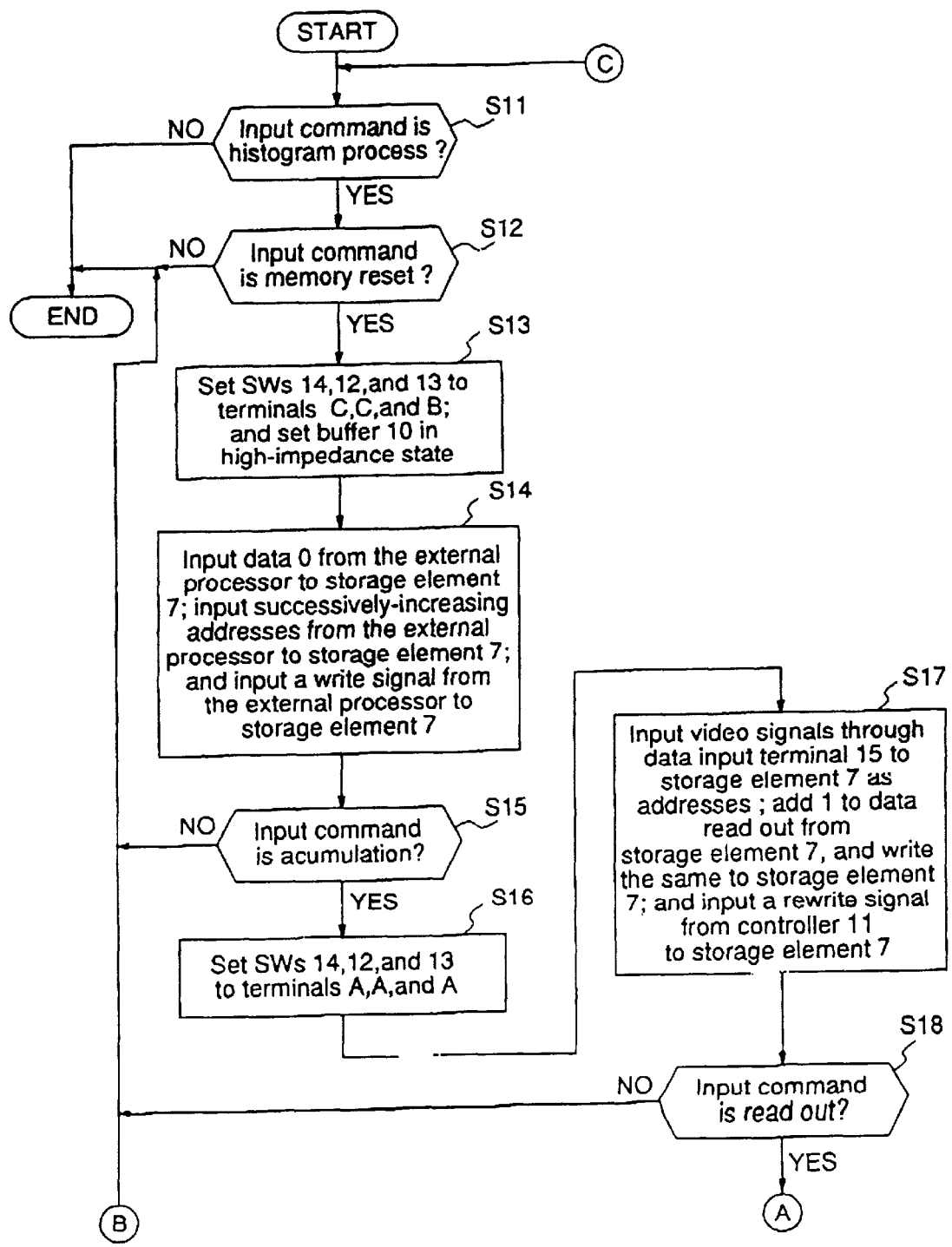
FIG. 12 is a flowchart showing how a memory of the video signal processing device in accordance with the third embodiment of this invention operates in executing a histogram process and an LUT process.
Figure 13:
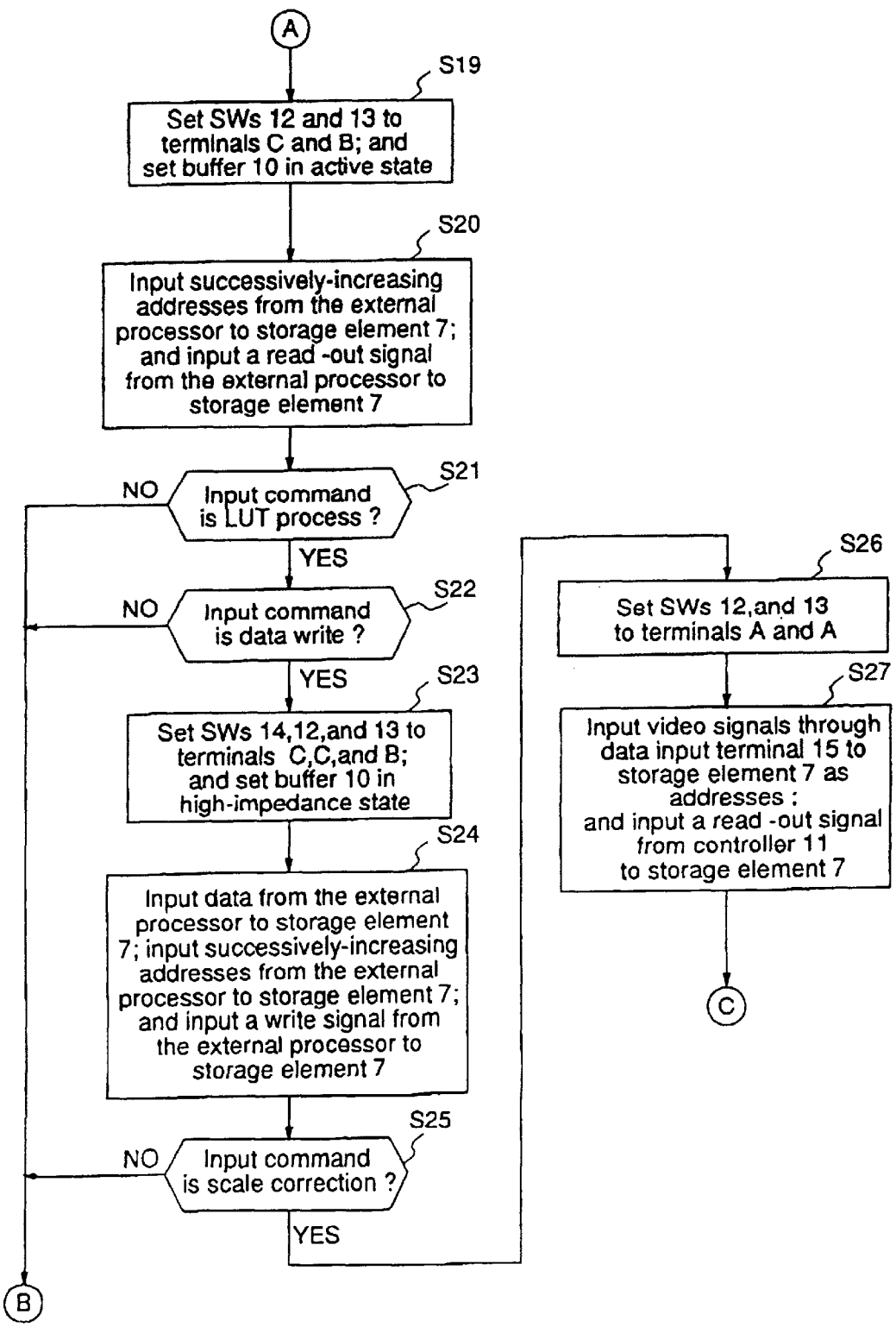
FIG. 13 is a flowchart showing how a memory of the video signal processing device in accordance with the third embodiment of this invention operates in executing a histogram process and an LUT process.

FIGS. 12 and 13 are flowcharts showing a histogram process and an LUT process executed by the memory shown in FIG. 8.

<FIFO process>

When there is, as shown by step S1 in FIG. 11, a command of executing the FIFO process in commands input to the controller 11 through the command input terminal 22, the controller 11 shown in FIG. 8 controls the first SW 14, in a way in which the armature 14a is connected to the terminal B, so that the input video signal, i.e., input data, through the data input terminal 15 is stored in the storage element 7 as data. The controller 11 also controls the second SW 12, in a way in which the armature 12a is connected to the terminal B, so that the input address of the storage element 7 is switched to the address output from the controller 11, and the address given to the storage element 7 increases by one. The controller 11 also controls the third SW 13, in a way that the armature 13a is connected to the terminal A, so that a data rewrite signal is input from the controller 11 to the storage element 7, and data read from each address is written to an adjacent address. Thereby, data input to the storage element 7 are successively output in the order when data were input to the storage element.

<Histogram process>

Here, the histogram process for video signals is to calculate a histogram in a field (frame) of period.

When there is, as is shown by step S11 in FIG. 12, a command of executing the histogram process in commands input to the controller 11 through the command input terminal 22, initially, in a V blanking period (see ① in FIG. 9), as shown by step S12 in FIG. 12, a command of resetting a memory is input through the command input terminal 22 to the memory 4, and set (see ① in TABLE 1). The memory 4 is reset so that all data in the memory 4 are 0 values. That is, the storage element 7 is reset by inputting 0 values through the external data input/output terminal 19 while successively changing addresses input through the external address input terminal 21.

Specifically, as shown by steps S13 and S14 in FIG. 12, in a blanking period of video signals, the controller 11 controls the first SW 14, in a way in which the armature 14a is connected to the terminal C, so that the storage element 7 stores input data 0 of the external processor as data. The controller also controls the second SW 12, in a way in which the armature 12a is connected to the terminal C, so that the input address of the storage element 7 is switched to the input address from the external processor. The controller 11 also controls the third SW 13, in a way that the armature 13a is connected to the terminal B, so that a memory control signal is input from the external processor to the storage element 7. Thereafter, the controller inputs an H level of a control signal to the buffer 10 so that the level of the buffer 10 becomes a high-impedance level. Thereby, the buffer 10 becomes inactive. At the time, the controller 11 outputs a data rewrite signal to the storage element 7, thereby resetting the memory 4.

Next, in a video period (see ② in FIG. 9), as shown by step S15 in FIG. 12, a command of accumulation (② in TABLE 1) is input through the command input terminal 22 to the controller 11, and set, and the characteristics of video signals are extracted (hereinafter referred to as "histogram detection process"). In the histogram detection process, a video signal input through the data input terminal 15 is used as an address of the storage element 7, data corresponding to the address is read out, the incrementer 9 adds 1 to the address, and the resultant address is input again to the storage element 7 through the limiter 8.

To be specific, as shown by steps S16 and S17 in FIG. 12, in a video period, the controller 11 controls the first SW 14, in a way in which the armature 14a is connected to the terminal A, so that the storage element 7 stores an output of the incrementer 9 input through the limiter 8, as data. The controller 11 also controls the second SW 12, in a way in which the armature 12a is connected to the terminal A, so that the input address of the storage element 7 is switched to the input video signal. The controller 11 also controls the third SW 13, in a way in which the armature 13a is connected to the terminal A, so that the storage element control signal output from the controller 11 is input to the storage element 7, i.e., a data rewrite signal is input to the storage element 7, and accumulation is carried out. Thus, video signals are accumulated for each level, corresponding to times of appearance of each level.

Thereafter, in a next V blanking period (see ③ in FIG. 9), as shown by step S18 in FIG. 12, a command of reading out data (hereinafter referred to as "data read output command") (③ in TABLE 1) is input through the command input terminal 22 to the controller 11, and set, and the controller 11 reds out data through the external data input/output terminal 19.

Specifically, as shown by steps S19 and S20 in FIG. 13, in the next V blanking period, the controller 11 controls the second SW 12, in a way in which the armature 12a is connected to the terminal C, so that the input address of the storage element 7 is switched to the input address from the external processor. The controller 11 also controls the third SW 13, in a way in which the armature 13a is connected to the terminal B, so that address signals from the external processor is input to the storage element 7. Thereafter, the controller inputs an L level of a control signal to the buffer 10 so that the buffer 10 becomes active. At the time, the controller 11 outputs a data read out signal to the storage element 7, thereby reading out data.

<LUT process>

Here, the LUT process for video signals is defined as follows. In reading out data set by the external processor, video signals input through the data input/output terminal 15 is read out as addresses, and the data is subjected to tone correction.

Initially, when a command of executing the LUT process for video signal is issued as shown by step S21 in FIG. 13, in a V blanking period, as shown by step 22 in FIG. 13, a command of writing data (④ in TABLE 1) is input through the command input terminal 22 to the controller 11, and set, the data input through the external data input/output terminal 19 is set to the storage element 7 with control signals input through the external memory control signal input terminal 20, and address signals input through the external address input terminal 21.

Specifically, as shown by steps S23 and S24 in FIG. 13, in a blanking period of video signals, the controller 11 controls the first SW 14, in a way in which the armature 14a is connected to the terminal C, so that the storage element 7 stores data input from the external processor as data. The controller 11 also controls the second SW 12, in a way in which the armature 12a is connected to the terminal C, so that the input address of the storage element 7 is switched to the input address from the external processor. The controller 11 also controls the third SW 13, in a way in which the armature 13a is connected to the terminal B, so that a memory control signal is input from the external processor to the storage element 7. Thereafter, the controller 11 inputs an H level of a control signal to the buffer 10 so that the level of the buffer 10 becomes a high-impedance level (hereinafter referred to as "Hi-Z"). Thereby, the buffer 10 becomes inactive. At the time, the controller 11 outputs a data write signal to the storage element 7, thereby writing data which is referred in looking up the table.

Next, in a video period (⑤ in FIG. 9), as shown by step S25 in FIG. 13, a command of correcting tones (⑤ in TABLE 1) is input through the command input terminal 22 to the controller 11, and set, and video signals input through the data input terminal 15 are rendered addresses of the storage element 7. Thereby, the data having been stored in the storage element 7 are read out through the data output terminal 16.

To be specific, as shown by steps S26 and S27 in FIG. 13, in a video period, the controller 11 controls the second SW 12, in a way in which the armature 12a is connected to the terminal A, so that the input address of the storage element 7 stores a storage element control signal output from the controller 11. If a data read out signal is output to the storage element 7, looking up the table can be carried out. Accordingly, correcting tones of video signals can be carried out by storing, in advance, data for correcting tones of video signals as data referred in looking up the table, in the storage element 7.

That is, in the video signal processing device in accordance with the third embodiment, when the FIFO process is carried out for video signals, the controller 11 controls the first SW 14 so that the input video signals are stored in the storage element 7 as data. The controller 11 also controls the second SW 12 so that the input address of the storage element 7 is switched to the output address from the controller 11. The controller 11 also controls the third SW 13 so that a storage element control signal output from the controller 11 is stored in the storage element 7 as data, and a data rewrite signal is output to the storage element 7.

When the histogram process is carried out for video signals, the controller 11, initially, in a blanking period of video signals, controls the first SW 14 so that input data from the external processor is stored in the storage element 7 as data. The controller 11 also controls the second SW 12 so that the input address of the storage element 7 is switched to the input address from the external processor. The controller 11 also controls the third SW 13 so that a memory control signal input from the external processor is stored in the storage element 7 as data. Thereafter, the controller controls the buffer 10 so that the buffer 10 becomes inactive, and outputs the a data write signal to the storage element 7. Thereby, the memory 4 is reset. Next, in a video period, the controller 11 controls the first SW 14 so that the outputs from the limiter 8 are stored in the storage element 7 as data. The controller 11 also controls the second SW 12 so that the input address of the storage element 7 is switched to the input video signal. The controller 11 also controls the third SW 13 so that a storage element control signal output from the controller 11 is stored in the storage element 7 as data. Thereafter, the controller 11 outputs a data rewrite signal to the storage element 7. Thereby, accumulation is carried out in the storage element 7.

Afterward, the controller 11, in a next blanking period of video signals, controls the second SW 12 so that the input address of the storage element 7 is switched to the input address from the external processor. The controller 11 also controls the third SW 13 so that a memory control signal input from the external processor is stored in the storage element 7 as data. Thereafter, the controller 11 controls the buffer 10 so that the buffer 10 becomes a active, and outputs a data read out signal to the storage element 7. Thereby, reading out data is carried out.

When the LUT process is carried out for video signals, the controller 11, initially, in a blanking period of video signals, controls the first SW 14 so that the storage element 7 stores input data from the external processor as data. The controller 11 also controls the second SW 12 so that the input address of the storage element 7 is switched to the input address from the external processor. The controller 11 also controls the third SW 13 so that the storage element 7 stores a memory control signal input from the external processor as data. Thereafter, the controller 11 controls the buffer 10 so that the buffer becomes inactive, and outputs a data write signal to the storage element 7. Thereby, writing data is carried out in the storage element 7. Next, in a video period, the controller 11 controls the second SW 12 so that the input address of the storage element 7 is switched to the input video signal. The controller 11 also controls the third SW 13 so that the storage element 7 stores a storage element control signal output from the controller 11 as data, and outputs a data read out signal to the storage element 7. Thereby, correcting tones of video signals is carried out in the storage element 7.

As described above the memory 4 in FIG. 8 carries out the histogram process at ①, ②, and ③ in FIG. 9. A result of the histogram process produced at ③ is reflected in the LUT process started at ④ within the same V blanking period as ③. At ④ and ⑤ in FIG. 9, the LUT process is carried out. Thereby, as shown in FIG. 10, the characteristics or tones of video signals can be corrected from liner to non-liner.

As hereinbefore pointed out, according to the third embodiment, only the programmable memory 4 included inside the video signal processing device makes it possible to switch the FIFO process, the histogram process, and the LUT process for video signals.

Embodiment 3

Figure 14:
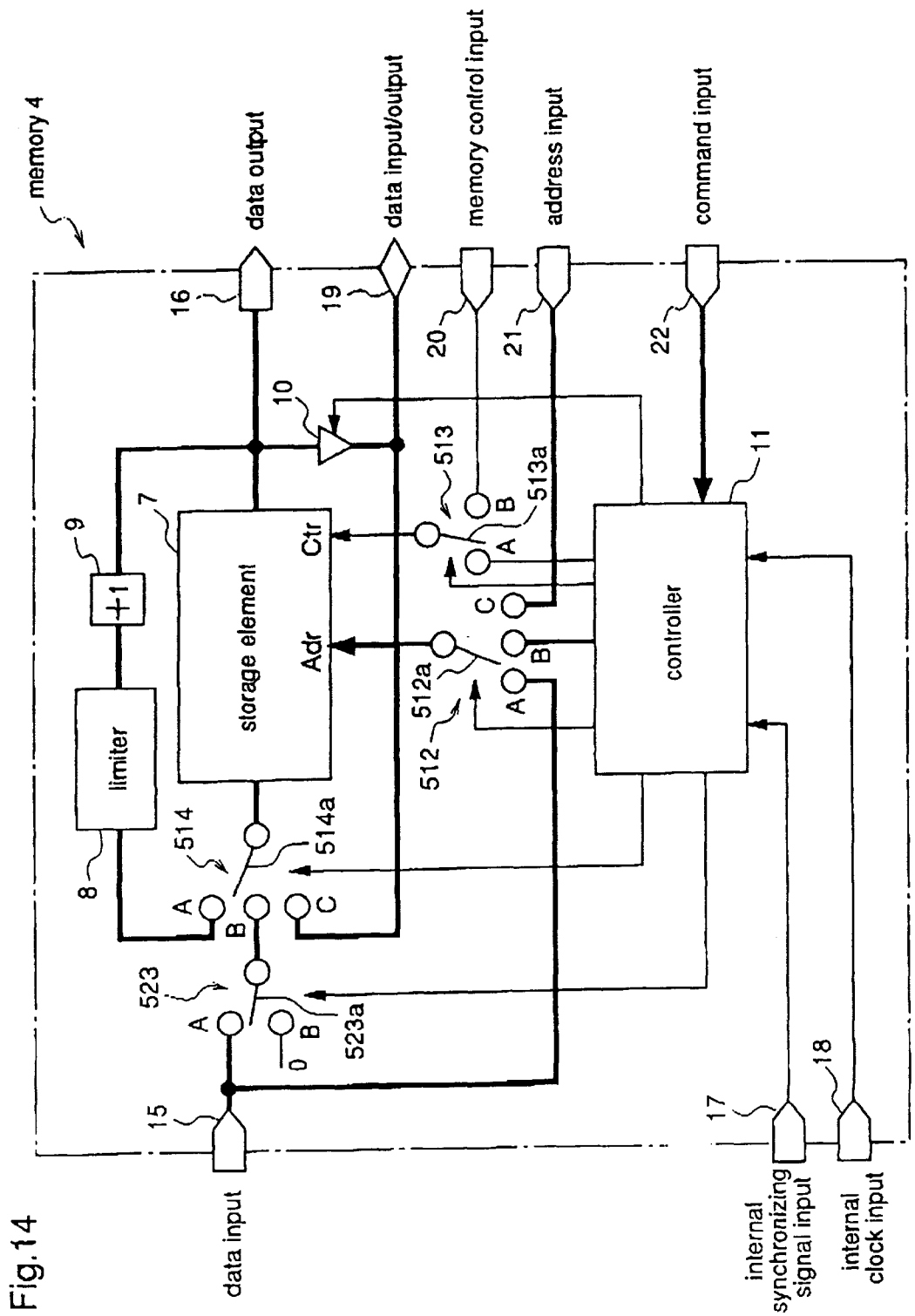
FIG. 14 is a block diagram showing a configuration of a memory of the video signal processing device in accordance with the third embodiment of this invention.

FIG. 14 is a block diagram showing a configuration of a memory of a video signal processing device in accordance with a fourth embodiment of histogram invention.

As shown in FIG. 14, a memory 4 of the video signal processing device comprises a storage element 7, and controller 11, an incrementer 9, a limiter 8, a first switching device 523 (hereinafter referred to as "first SW"), a second switching device 514 (hereinafter referred to as "second SW"), a third switching device 512 (hereinafter referred to as "third SW"), a fourth switching device 513 (hereinafter referred to as "fourth SW"), and a buffer 10. The storage element 7 stores digital data. The controller 11 controls the storage element 7. The incrementer 9 adds 1 to an output signal of the storage element 7. The limiter 8 limits the output of the incrementer 9 to a predetermined value. The first SW 523 selects one of the input video signal and 0 values, and outputs a switching signal. The second SW 514 selects one of the output of the limiter 8, the switching signal from the first SW 523, and the input data of an external system, such as an external processor not shown (hereinafter referred to as "external processor"), and stores the selected one in the storage element 7 as data. The third SW 512 selects one of the input video signal, the address output from the controller 11, and the input address of the external processor, and switches the input address of the storage element 7 to the selected one. The fourth SW 512 selects one of a signal for controlling the storage element output from the controller 11 (hereinafter referred to as "storage element control signal"), and a signal for controlling the storage element output from the external processor (hereinafter referred to as "memory control signal"), and stores the selected one in the storage element 7 as data. The buffer 10 outputs the output of the storage element 7 to the external processor. The first SW 523, the second SW 514, the third SW 512, the fourth SW 513, the buffer 10, and switching control signals of the storage element 7, can produce an FIFO (First-In First-Out) process, the histogram process, and an LUT (Look-Up Table) process including tone correction, shown in TABLE 2, for video signals. The other portion of a configuration is similar to that of the second embodiment. Note that the memory 4 is equivalent to the memories 401, . . . , 40n of the second embodiment.

TABLE 2

| OPERATION (COMMAND) | 1ST SW 523 | 2ND SW 514 | 3RD SW 512 | 4TH SW 513 | BUF 10 | CTR |
|---|---|---|---|---|---|---|
| FIFO | A | B | B | A | — | W/R |
| HISTOGRAM | | | | | | |
| ① MEMORY RESET | B | B | B | A | H (Hi Z) | W |
| ② ACCUMULATION | — | A | A | A | — | W/R |
| ③ DATA READ | — | — | C | B | L | R |
| LUT | | | | | | |
| ④ DATA WRITE | — | C | C | B | H (Hi Z) | W |
| ⑤ TONE CORRECTION | — | — | A | A | — | R |

A description is given of how the video signal processing device works referring to FIGS. 14, 15, 16 and 17, and TABLE 2.

Figure 15:
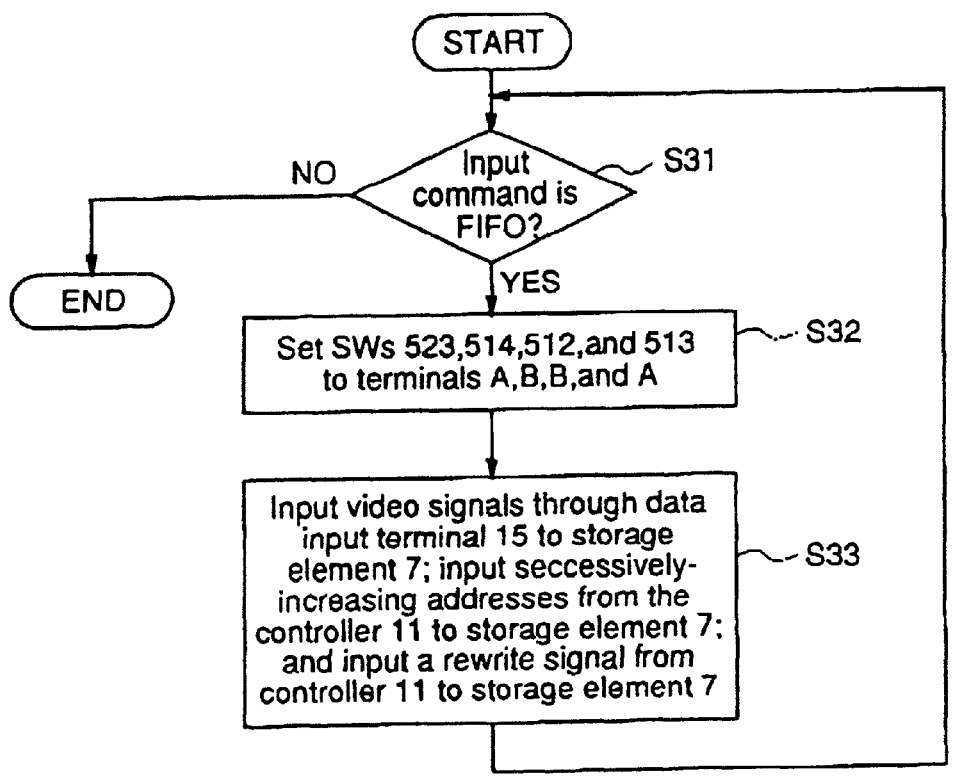
FIG. 15 is a flowchart showing how a memory of the video signal processing device in accordance with the fourth embodiment of this invention operates in executing an FIFO process.

FIG. 15 is a flowchart showing the FIFO process executed by a memory shown in FIG. 14.

Figure 16:
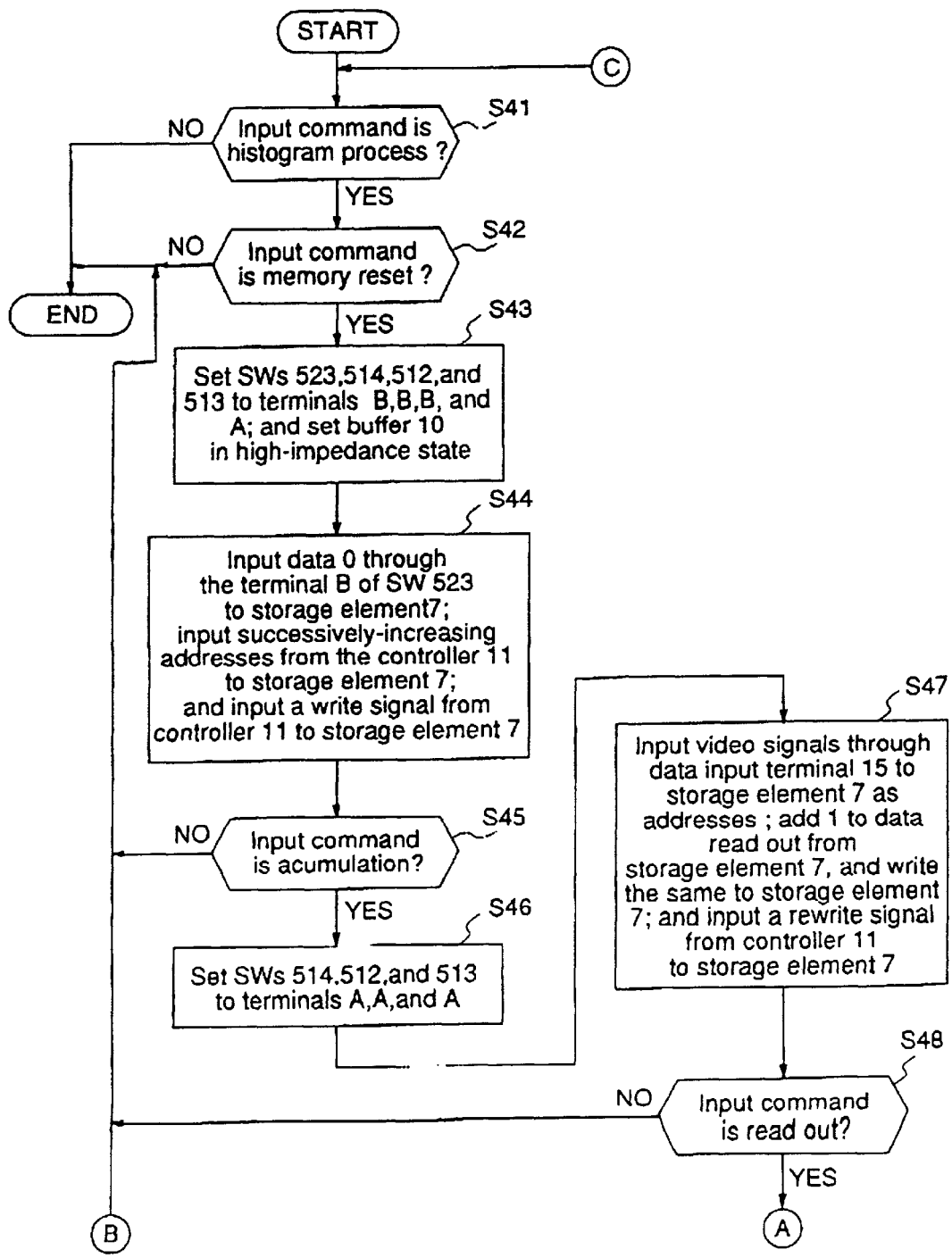
FIG. 16 is a flowchart showing how a memory of the video signal processing device in accordance with the fourth embodiment of this invention operates in executing a histogram process and an LUT process.
Figure 17:
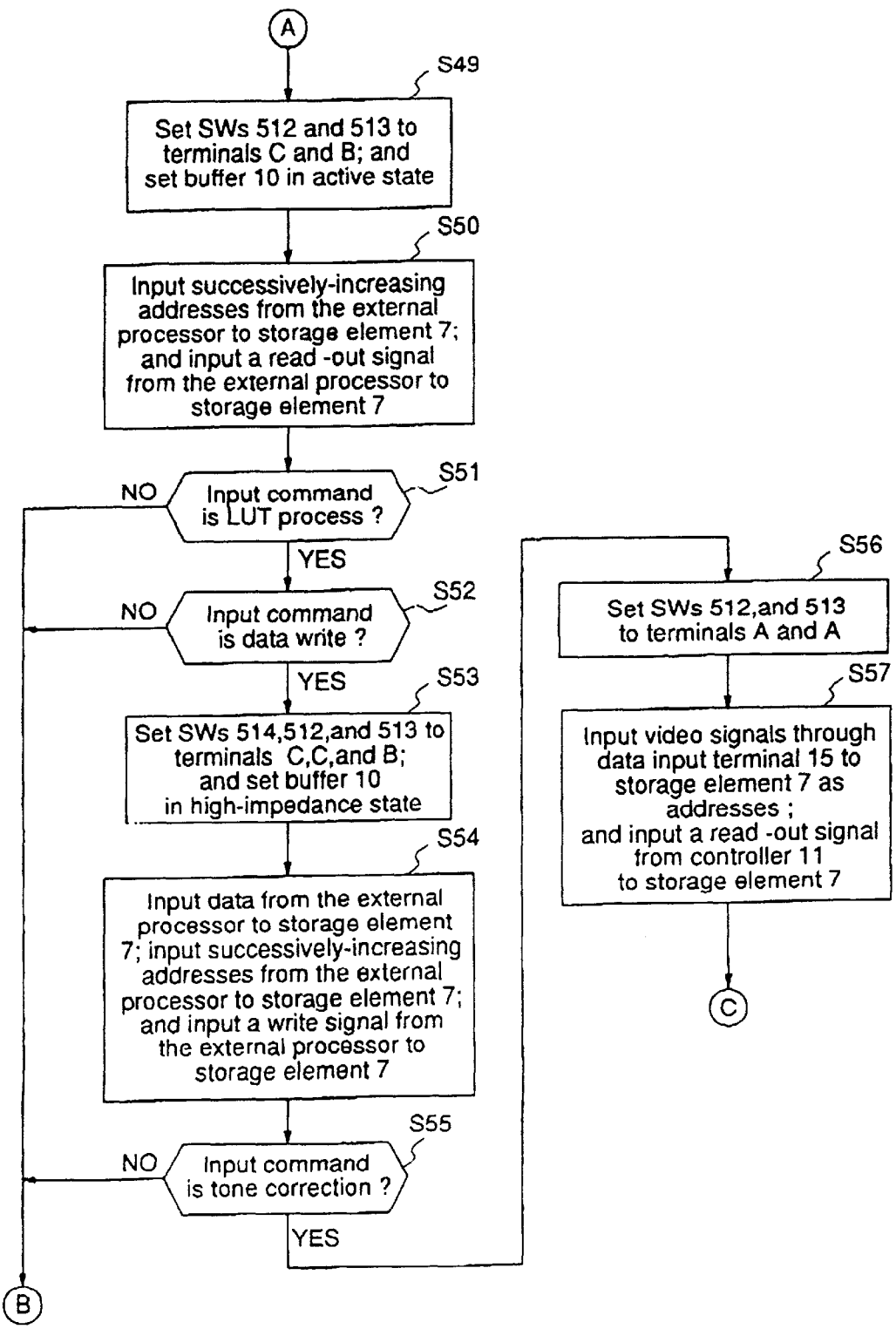
FIG. 17 is a flowchart showing how a memory of the video signal processing device in accordance with the fourth embodiment of this invention operates in executing a histogram process and an LUT process.

FIGS. 16 and 17 are flowcharts showing the histogram process and the LUT process executed by the memory shown in FIG. 14.

<FIFO process>

When there is, as is shown by step S31 in FIG. 15, a command of executing the FIFO process, the controller 11, as shown in steps S32 and S33 in FIG. 15, controls the first SW 523, in a way in which the armature 523a is connected to the terminal A, so that the input video signal is output as a switching signal. The controller 11 also controls the second SW 514, in a way in which the armature 514a is connected to the terminal B, so that the switching signal from the first SW 523 is stored in the storage element 7 as data. The controller 11 also controls the third SW 512, in a way that the armature 512a is connected to the terminal B, so that the input address of the storage element 7 is switched to the address output from the controller 11. The controller 11 also controls the fourth SW 513, in a way in which the armature 513a is connected to the terminal A, so that a storage element control signal output from the controller 11 is stored in the storage element 7 as data, and outputs a data rewrite signal to the storage element 7. Thereby, data read from each address is written to an adjacent address, so data input to the storage element 7 are successively output in the order when data was input to the storage element.

<Histogram process>

As shown by step S41 in FIG. 16, when there is a command of executing the histogram process for video signals, initially, in a V blanking period, as shown by step S42 in FIG. 16, a command of resetting a memory (① in TABLE 2) is input through the command input terminal 22 to the controller 11, and set. The controller 11 resets the memory 4, so that data in the memory 4 all become 0 values. That is, the storage element 7 is reset by inputting 0 values through the external data input/output terminal 19 while changing the output address from the controller 11.

To be specific, as shown by steps S43 and S44 in FIG. 16, in a blanking period of video signals, the controller 11 controls the first SW 523, in a way in which the armature 523a is connected to the terminal B, so that 0 values are output as a switching signal. The controller 11 also controls the second SW 514, in a way in which the armature 514a is connected to the terminal H, so that a switching signal from the first SW 523 is stored in the storage element 7 as data. The controller 11 also controls the third SW 512, in a way in which the armature 512a is connected to the terminal B, so that the input address of the storage element 7 is switched to the address output from the controller 11. The controller 11 also controls the fourth SW 513, in a way in which the armature 513a is connected to the terminal A, so that a storage element control signal output from the controller 11 is stored in the storage element 7 as data. Thereafter, the controller 11 inputs an H level of a control signal to the buffer 10 so that the output of the buffer 10 becomes Hi-X. Thereby, the buffer 10 becomes inactive. At the time, the control 11 outputs a data write signal to the storage element 7, thereby resetting the memory 4. Thus, the time needed to reset is much reduced compared with the memory in FIG. 8 where the external processor writes 0 values to the memory.

Next, in a video period, as shown by stop S45 in FIG. 16, a command of accumulation (② in TABLE 2) is input through the command input terminal 22 to the controller 11, and set. The histogram detection process is carried out so that the characteristics and the like of input video signals (video data) are extracted. In this process, video signals input from the data input terminal 15 are used as addresses of the storage element 7, data corresponding to the addresses are added 1 by the incrementer 9, and the data are input to the same addresses again.

To be specific, as shown by steps S46 and S47 in FIG. 16, in a video period, the controller 11 controls the second SW 514, in a way in which the armature 514a is connected to the terminal A, so that the storage element 7 stores the output from the limiter 8 as data. The controller 11 also controls the third SW 512, in a way in which the armature 512a is connected to the terminal A, so that the input address of the storage element 7 is switched to the input video signal. The controller 11 also controls the fourth SW 513, in a way in which the armature 513a is connected to the terminal A, so that the storage element 7 stores a storage element control signal output from the controller 11 as data. Thereafter, the controller 11 outputs a data rewrite signal to the storage element 7 so that accumulation is carried out. Thus, video signals are accumulated for each level, corresponding to times of appearance of each level.

Afterward, in a next V blanking period, based on the result of the accumulation, as shown by step S48 in FIG. 16, a command (③ in TABLE 1) of reading out data is input through the command input terminal 22, and set. Data are read out through the external data input/output terminal 19.

To be specific, as shown by steps S49 and S50 in FIG. 17, in a next blanking period of video signals, the controller 11 controls the third SW 512, in a way in which the armature 512a is connected to the terminal C, so that the input address of the storage element 7 is switched to the input address from the external processor. The controller 11 also controls the fourth SW 513, in a way in which the armature 513a is connected to the terminal B, so that a memory control signal input from the external processor is stored in the storage element 7 as data. Thereafter, the controller 11 controls the buffer 10 so that the level of the buffer 10 becomes an L level, i.e., an active state. At the time, a data read out signal is output to the storage element 7 so that reading out data is carried out.

LUT Process

Initially, when a command of executing the LUT process for video signal is issued as shown by step S51 in FIG. 17, in a V blanking period, as shown by step 52 in FIG. 17, a command of writing data (④ in TABLE 1) is input through the command input terminal 22 to the controller 11, and set, and data input through the external data input/output terminal 19 is set to the storage element 7 by control signals input through the external memory control signal input terminal 20, and address signals input through the external address input terminal 21.

Specifically, as shown by steps S53 and S54 in FIG. 17, in a blanking period of video signals, the controller 11 controls the second SW 514, in a way in which the armature 514a is connected to the terminal C, so that the storage element 7 stores data input from the external processor as data. The controller 11 also controls the third SW 512, in a way in which the armature 512a is connected to the terminal C, so that the input address of the storage element 7 is switched to the input address from the external processor. The controller 11 also controls the fourth SW 513, in a way in which the armature 513a is connected to the terminal B, so that a memory control signal is input from the external processor to the storage element 7, and stored. Thereafter, the controller 11 controls the buffer 10 so that the level of the buffer 10 becomes an H level (Hi-Z). Thereby, the buffer 10 becomes inactive. At the time, the controller 11 outputs a data write signal to the storage element 7, thereby writing data which is referred in looking up the table.

Next, in a video period, as shown by step S55 in FIG. 17, a command of correcting tones (⑤ in TABLE 1) is input through the command input terminal 22 to the controller 11, and set, and video signals input through the data input terminal 15 are rendered addresses of the storage element 7. Thereby, the data having been stored in the storage element 7 are read out through the data output terminal 16.

To be specific, as shown by steps S56 and S57 in FIG. 17, in a video period, the controller 11 controls the third SW 512, in a way in which the armature 512a is connected to the terminal A, so that the input address of the storage element 7 is switched to the input video signal. The controller 11 also controls the fourth SW 513, in a way in which the armature 513a is connected to the terminal A, so that the storage element 7 stores a storage element control signal output from the controller 11 as data. If a data read out signal is output to the storage element 7, looking up the table can be carried out. Accordingly, correcting tones of video signals can be carried out by storing, in advance, data for correcting tones of video signals, as data referred in looking up the table, in the storage element 7.

That is, in the video signal processing device in accordance with the fourth embodiment, when the FIFO process is carried out for video signals, the controller 11 controls the first SW 523 so that the input video signal is output as a switching signal. The controller 11 also controls the second SW 514 so that the switching signal is stored in the storage element 7 as data. The controller 11 also controls the third SW 512 so that the input address of the storage element 7 is switched to the address output from the controller 11. The controller 11 also controls the fourth SW 513 so that a storage element control signal output from the controller 11 is stored in the storage element 7 as data, and a data rewrite signal is output to the storage element 7.

When the histogram process is carried out for video signals, the controller 11, initially, in a blanking period of video signals, controls the first SW 523 so that 0 values are output as a switching signal. The controller 11 also controls the second SW 514 so that the switching signal through the first SW 523 is stored in the storage element 7 as data. The controller also controls the third SW 512 so that the input address of the storage element 7 is switched to the address output from the controller 11. The controller 11 also controls the fourth SW 513 so that a memory control signal input from the controller 11 is stored in the storage element 7 as data. Thereafter, the controller controls the buffer 10 so that the buffer 10 becomes inactive, and outputs the a data write signal to the storage element 7. Thereby, the memory 4 is reset. Next, in a video period, the controller 11 controls the second SW 514 so that the outputs from the limiter 8 are stored in the storage element 7 as data. The controller 11 also controls the third SW 512 so that the input address of the storage element 7 is switched to the input video signal. The controller 11 also controls the fourth SW 513 so that a storage element control signal output from the controller 11 is stored in the storage element 7 as data. Thereafter, the controller 11 outputs a data rewrite signal to the storage element 7. Thereby, accumulation is carried out in the storage element 7. Afterward, the controller 11 controls the third SW 512 so that the input address of the storage element 7 is switched to the input address from the external processor. The controller 11 also controls the fourth SW 513 so that a memory control signal input from the external processor is stored in the storage element 7 as data. Thereafter, the controller 11 controls the buffer 10 so that the buffer 10 becomes active, and outputs a data read out signal to the storage element 7. Thereby, reading out data is carried out.

When the LUT process is carried out for video signals, the controller 11, initially, controls the second SW 514 so that the storage element 7 stores input data from the external processor as data. The controller 11 also controls the third SW 512 so that the input address of the storage element 7 is switched to the input address from the external processor. The controller 11 also controls the fourth SW 513 so that the storage element 7 stores a memory control signal input from the external processor as data. Thereafter, the controller 11 controls the buffer 10 so that the buffer becomes inactive, and outputs a data write signal to the storage element 7. Thereby, writing data is carried out in the storage element 7. Next, the controller 11 controls the third SW 512 so that the input address of the storage element 7 is switched to the input video signal. The controller 11 also controls the fourth SW 513 so that the storage element 7 stores a storage element control signal output from the controller 11 as data, and outputs a data read out signal to the storage element 7. Thereby, correcting tones of video signals is carried out in the storage element 7.

As described above, according to the fourth embodiment, only the programmable memory 4 included in the video signal processing device makes it possible to switch the FIFO process, the histogram process, and the LUT process for video signals.

Embodiment 5

Figure 18:
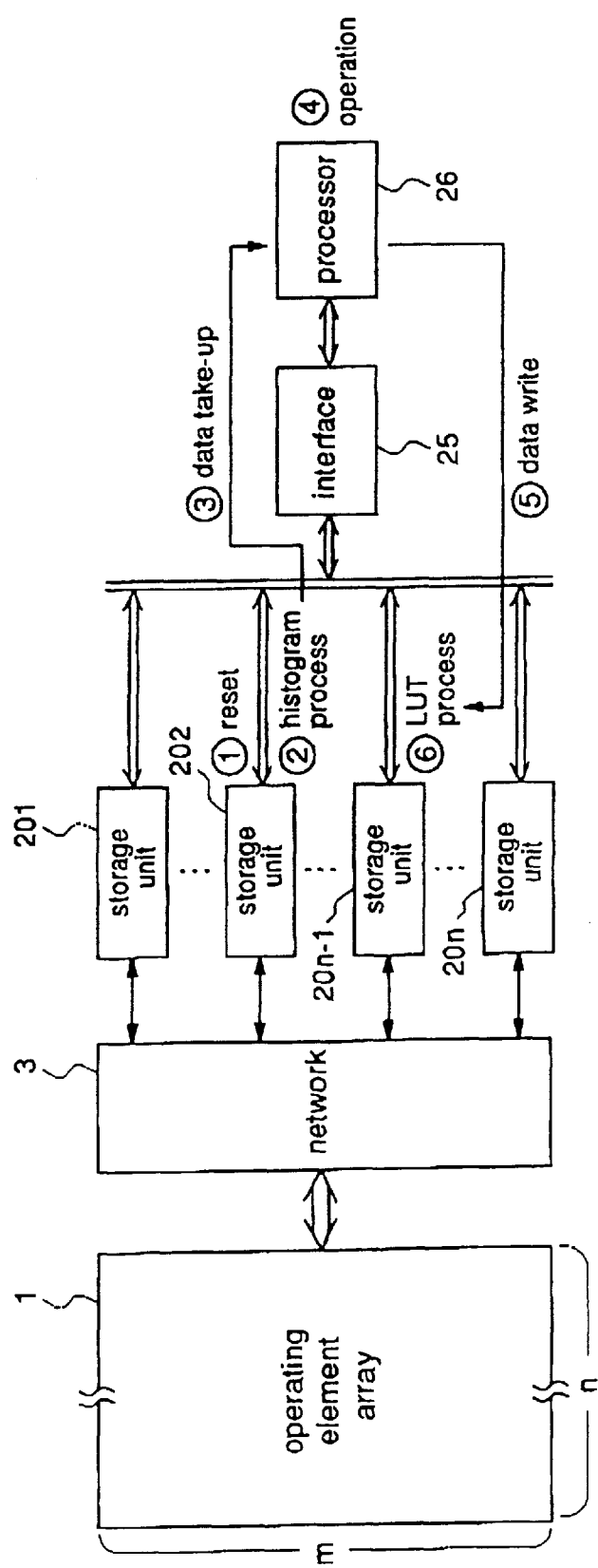
FIG. 18 is a block diagram showing a configuration of a video signal processing device in accordance with the fifth embodiment of this invention.

FIG. 18 is a block diagram showing a configuration of a video signal processing device in accordance with a fifth embodiment of this invention.

FIG. 18, the video signal processing device comprises storage units 20l, . . . , 20n, memories (not shown) included in the storage units 20l, . . . , 20n, respectively, a processor 26, and an interface 25. The storage units 20l, . . . , 20n each include the memory proposed in the third or the fourth embodiment. The processor 26 sets commands, reads out data, and writes data. The interface 25 controls signal communications between the storage unit 20l, . . . , 20n, and the processor 26. A memory in an arbitrary storage unit calculates the histogram of input video signals, and transmits the calculated histogram through the interface 25 to the processor 26. The processor 26 detects data of correcting tones of the video signals, based on the transmitted histogram. The tone correcting data detected is transmitted through the interface 25 to a memory included in another storage unit. The portions of the configuration other than the above-mentioned portion are the same as those in the first embodiment.

Figure 19:
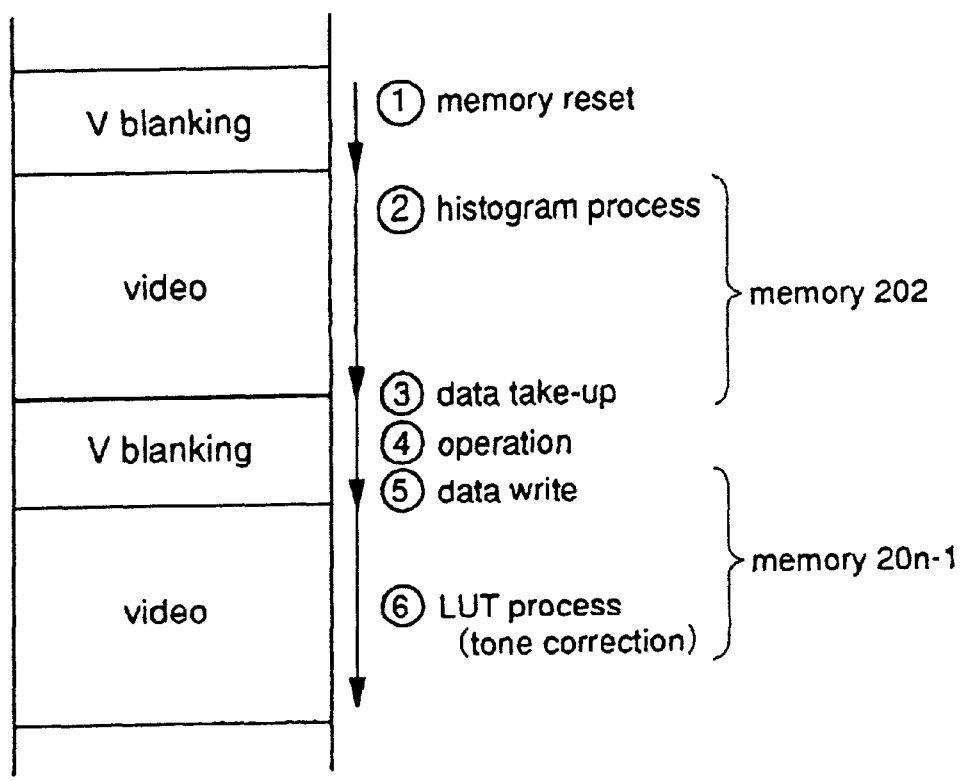
FIG. 19 is a schematic diagram showing operation timings of a tone correcting process.
Figure 20:
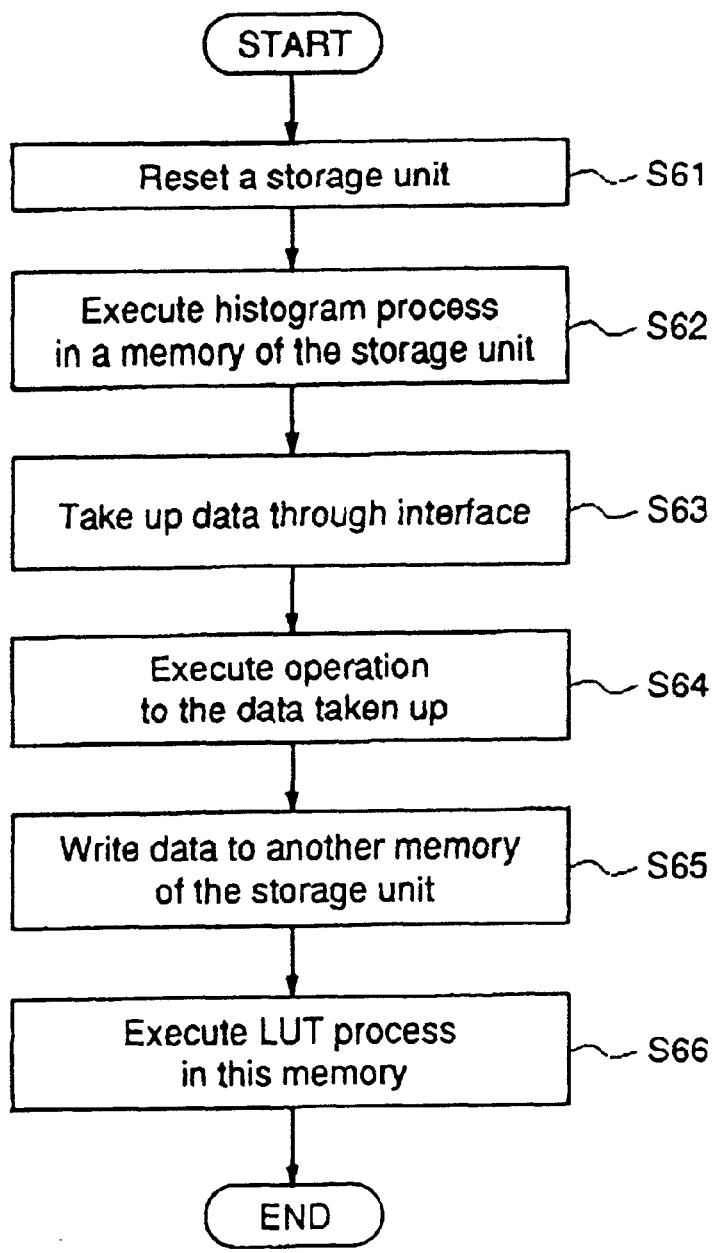
FIG. 20 is a flowchart showing operational timing of a tone correcting process.

Here, the tone correcting process of the video signal processing device is explained referring to FIGS. 18, 19, and 20.

FIG. 19 is a schematic diagram showing operational timings of the tone correcting process.

FIG. 20 is a flowchart showing operational timings of the tone correcting process.

In a V blanking period (see ① in FIG. 19), as shown by step S61 in FIG. 20, the processor 26 resets the storage unit 20l, . . . , 20n. In a video period (see ② in FIG 19), the processor 26 sets a command of carrying out the histogram process to a memory of an arbitrary one of the storage units 20l, . . . , 20n, as shown by step S62 in FIG. 20. Thereafter, the histogram process is carried out for video signals in the memory.

In a next blanking period (see ③ in FIG. 19), the processor 26 sets a command of taking up data to the memory through the interface 25 as shown by step S63 in FIG. 20, and after that, takes up data through the interface 25 from the memory.

Next, in the above-mentioned blanking period (see ④ in FIG. 19), the processor 26, as shown by step S64 in FIG. 20, operates the tone correcting data using the data taken up as a reference. At the time, such tone correction as gamma correction is always carried out.

Afterward, in the above-mentioned blanking period (see ⑤ in FIG. 19), based on a result of the operation, the processor 26, as shown by step S65 in FIG. 20, sets a command of writing data to a memory of another arbitrary one of the storage units 20*l*, . . . , 20*n* through the interface 25, and after that, writes data to the memory through the interface 25.

Finally, in a next video period (see ⑥ in FIG. 12), the processor 26, as shown by step S66 in FIG. 20, carries out the LUT process in the memory.

A series of these processes, i.e., ①resetting, ②histogram process, ③taking up data, ④operation, ⑤writing data, and ⑥LUT process are carried out for each field (frame).

As described above, in the video signal processing device in accordance with the fifth embodiment, a histogram of input video signals is calculated in a memory included in an arbitrary storage unit. The calculated histogram is transmitted through the interface 25 to the processor 26. The processor 26 detects tone correcting data for video signals based on the histogram transmitted, and transmits the tone correcting data detected to a memory included in another storage unit through the interface 25.

Thus, according to the fifth embodiment, an optimal tone correcting process can be achieved for input video signals.

It should be noted that this invention is not restricted to the above-described embodiments. It is possible to do various changes and modifications within the scope of the invention.

What is claimed is:

1. A video signal processing device changing ways of processing digitized video signals, according to commands from programs, and comprising:

an operating unit for processing the video signals according to commands from the programs, the operator unit comprising an operator for processing the video signals, and an operation element command memory for holding a command of operating the operator, and outputting the command to the operator according to input commands;

a storage unit for storing the video signals according to commands from the programs the storage unit comprising at least one data memory for storing data related to video signals input, a command setting unit for setting commands to the data memories, and a register for storing the commands set by the command setting unit, the data memory processing the stored data according to the commands stored in the register, and outputting the processed data; and a networking unit for switching connections between said operating unit and said storage unit according to commands from the programs, the networking unit comprising selectors for receiving the video signals from either the operating unit or the storage unit, switching the operating unit and the storage unit, and outputting the input video signals to either the operating unit or the storage unit, and signal switching command memories for holding commands of operating said selectors, and outputting the commands to said selectors according to input commands.

2. The video signal processing device according to claim 1 wherein:

said data memory comprises a storage element for storing digital data;

said storage element executes a First-In First-Out process for the video signals by storing digital data in said storage element in an order in which digital data have been input;

said storage element executes a histogram process by controlling said storage element in a way in which tones of the video signals correspond to addresses of the storage element, and by adding a predetermined value to the corresponding addresses to successively calculate histograms; and said storage element executes a look-up table process including correcting tones of the video signals by control of said storage element.

3. The video signal processing device according to claim 1 wherein said data memory comprises:

a storage element for storing digital data;

a controller for controlling said storage element;

an incrementer for adding 1 to a signal output from said storage element;

a limiter for limiting an output of said incrementer to a predetermined value;

a first selector for selecting one of an output of said limiter, the input video signal, and data input from the outside, and storing the selected one in said storage element;

a second selector for selecting one of the input video signal, an address output from said controller, and an address input from the outside, and switching the input address of said storage element to the selected one;

a third selector for selecting one of a memory control signal output from said controller, and a memory control signal input from the outside, and storing the selected one in said storage element; and a buffer for outputting a signal output from said storage element, outside said device.

4. The video signal processing device according to claim 3, wherein:

in an FIFO process for video signals, said controller controls said first selector so that said storage element stores the input video signals, controls said second selector so that the input address of said storage element is switched to the address output from said controller, and controls said third controller so that the memory control signal output from said controller is output, as a data rewrite signal, to said storage element;

in a histogram process for video signals, initially, said controller, in a blanking period of the video signals, controls said first selector so that said storage element stores data input from the outside, controls said second selector so that the input address of said storage element is switched to the address input from the outside, controls said third selector so that said third selector outputs a memory control signal input from the outside, as a data rewrite signal, to said storage element, and controls said buffer so that said buffer is inactive, and thereby, said data memory is reset; and next, in a video period, said controller controls said first selector so that said storage element stores outputs of said limiter, controls said second selector so that the input address of said storage element is switched to the input video signal, controls said third selector so that said storage element stores a memory control signal output from said controller, and outputs a data rewrite signal to said storage element so that accumulation is carried out in said storage element; afterward, said controller controls said second selector so that the input address of said storage element is switched to the input address from the outside, controls said third selector so that a memory control signal input from the outside, as a data read out signal, is output to said storage element, and controls said buffer so that the buffer becomes inactive, and thereby, reading out data from said storage element is carried out;

in a look-up table process including tone correction for video signals, said controller controls said first selector sot hat said storage element stores data input from the outside, controls said second selector so that the input address of said storage element is switched to the input address from the outside, controls said third selector so that a memory control signal input from the outside, as a data write signal, is output to said storage element, and controls said buffer so that said buffer becomes inactive, and writing data to the storage element is carried out; and next, said controller controls said second selector so that the input address of said storage element is switched to the input video signal, and controls said third selector so that a memory control signal, as a data read out signal output from said controller, is output to said storage element, and thereby, correcting tones of the video signals is carried out.

5. The video signal processing device according to claim 1 wherein said data memory comprises:

a storage element for storing digital data;

a controller for controlling said storage element;

an incrementer for adding 1 to a signal output from said storage element;

a limiter for limiting an output of said incrementer to a predetermined value;

a first selector for selecting one of the input video signal and 0 values, and outputting the selected one as a switching signal;

a second selector for selecting one of an output of said limiter, the input video signal, and data input from the outside, and storing the selected one in said storage element;

a third selector for selecting one of the input video signal, an address output from said controller, and an address input from the outside, and switching the input address of said storage element to the selected one;

a fourth selector for selecting one of a memory control signal output from said controller, and a memory control signal input from the outside, and storing the selected one in said storage element; and a buffer for outputting a signal output from said storage element, outside said device.

6. The video signal processing device according to claim 5 wherein:

in an FIFO process for video signals, said controller controls said first selector so that said first selector outputs the input video signal as a switching signal, controls said second storage element so that said storage element stores the switching signal as data, controls said third selector so that the input address of said storage element is switched to the address output from said controller, and controls said fourth controller so that the memory control signal output from said controller is output, as a data rewrite signal, to said storage element;

in a histogram process for video signals, initially, said controller, in a blanking period of the video signals, controls said first selector so that 0 values are output as a switch signal, controls said second selector sot that said storage element stores the switching signal input as data, controls said third selector so that the input address of said storage element is switched to the address output from said controller, controls said fourth selector so that a memory control signal input from the outside is output, as a data rewrite signal, to said storage element, and controls said buffer so that said buffer is inactive, and thereby, said data memory is reset; and next, in a video period, said controller controls said second selector so that said storage element stores outputs of said limiter as data, controls said third selector so that the input address of said storage element is switched to the input video signal, and controls said fourth selector so that a memory control signal output from said controller is output, as a data rewrite signal, to said storage element, and thereby, accumulation is carried out in said storage element;

afterward, said controller controls said third selector so that the input address of said storage element is switched to the input address from the outside, controls said fourth selector so that a memory control signal input from the outside, as a data read out signal, is output to said storage element, and controls said buffer so that the buffer becomes inactive, and thereby, reading out data from said storage element is carried out;

in a look-up table process including tone correction for video signals, said controller controls said second selector so that said storage element stores data input from the outside, controls said third selector so that the input address of said storage element is switched to the input address from the outside, controls said fourth selector so that a memory control signal input from the outside, as a data write signal, is output to said storage element, and controls said buffer so that said buffer becomes inactive, and thereby, writing data to the storage element is carried out;

next, said controller controls said third selector so that the input address of said storage element is switched to the input video signal, controls said fourth selector so that a memory control signal, as a data read out signal output from said controller, is output to said storage element, and thereby, correcting tones of the video signals is carried out.

7. A video signal processing device according to claim 1, comprising:

at least two storage units, each including said data memories;

a processor for setting commands, reading out data, and writing data, to said data memories included in said storage units;

an interface unit for interfacing said storage units with said processor;

a histogram of input video signals being calculated with said data memory included one of at least said two storage units, the calculated histogram being transmitted through said interface unit to said processor, said processor detecting data for correcting tones of the video signals, based on the histogram transmitted, and the detected data for correcting the tones being transmitted through said interface unit to another of at least two storage units.

* * * * *